United States Patent
Parayatham et al.

(10) Patent No.: US 10,733,183 B2
(45) Date of Patent: Aug. 4, 2020

(54) METHOD FOR SEARCHING FOR RELIABLE, SIGNIFICANT AND RELEVANT PATTERNS

(71) Applicant: Innominds Inc., San Jose, CA (US)

(72) Inventors: Arun Kumar Parayatham, Hyderabad (IN); Ravi Kumar Meduri, Secunderabad (IN)

( * ) Notice: Subject to any disclaimer, the term of this patent is extended or adjusted under 35 U.S.C. 154(b) by 880 days.

(21) Appl. No.: 14/960,439

(22) Filed: Dec. 6, 2015

(65) Prior Publication Data
US 2017/0161321 A1 Jun. 8, 2017

(51) Int. Cl.
| | |
|---|---|
| G06N 7/00 | (2006.01) |
| G06F 16/245 | (2019.01) |
| G06F 16/2455 | (2019.01) |
| G06F 16/2458 | (2019.01) |

(52) U.S. Cl.
CPC ........ *G06F 16/245* (2019.01); *G06F 16/2456* (2019.01); *G06F 16/2462* (2019.01); *G06N 7/005* (2013.01)

(58) Field of Classification Search
CPC ...... G06N 5/025; G06N 7/005; G06F 16/245; G06F 16/2456; G06F 16/2462
See application file for complete search history.

(56) References Cited

U.S. PATENT DOCUMENTS

2006/0074824 A1* 4/2006 Li .................... G06K 9/6217
706/20
2011/0004626 A1* 1/2011 Naeymi-Rad .......... G06N 7/005
707/776
2015/0142712 A1* 5/2015 Nakayama ............. G06N 5/025
706/14

OTHER PUBLICATIONS

Rokach, Lior, and Oded Maimon. "Top-down induction of decision trees classifiers—a survey." IEEE Transactions on Systems, Man, and Cybernetics, Part C (Applications and Reviews) 35.4 (2005): 476-487. (Year: 2005).*
Rounds, E. M. "A combined nonparametric approach to feature selection and binary decision tree design." Pattern Recognition 12.5 (1980): 313-317. (Year: 1980).*
Guyon, Isabelle, and André Elisseeff. "An introduction to variable and feature selection." Journal of machine learning research 3. Mar. 2003: 1157-1182. (Year: 2003).*

* cited by examiner

*Primary Examiner* — Li B. Zhen
*Assistant Examiner* — Markus A. Vasquez

(57) ABSTRACT

The software system processes extracts reliable, significant and relevant patterns. System runs through preprocessing steps. System then generates the size 1 patterns. It then checks for both reliability and refinability of the size 1 patterns. System grows the refinable patterns by increasing the attributes and its values in the pattern by one at a time to find a size 2 pattern. The system then uses the number of pattern occurrences of size 2 pattern as a basis to find the reliable patterns. System also checks for statistical significance over the size 1 patterns and once again for the refinability of the size 2 patterns. System checks for relevance of the size 1 patterns by obtaining the disjointed record complement set. Software system readjusts the pattern statistics of size 1 and removes the non-relevant super-patterns. This process is repeated from size 2 to N.

12 Claims, 11 Drawing Sheets

Data

- dataset: String
- attribute_set: ArrayList<Attribute>
- decision_attribute: Attribute
- class_set: ArrayList<String>
- class_freq_ditribution: HashMap<String,Integer>
- class_probability_distribution: HashMap<String,Double>
- minimum_class_probability: Double
- confidence_of_class_probability: Double
- significance_of_pattern: Double
- expected_class_minimum_probability: HashMap<String,Double>
- expected_class_min_frequency: HashMap<String,Integer>
- refinableable_patterns_set: ArrayList<RefinablePattern>
- reliable_pattern_set: HashMap<Integer,HashMap<String,ArrayList<Pattern>>>
- significant_pattern_set: HashMap<Integer,HashMap<String,ArrayList<Pattern>>>
- relevant_pattern_set: HashMap<Integer,HashMap<String,ArrayList<Pattern>>>
- sorted_pattern_set: HashMap<Integer,HashMap<String,ArrayList<Pattern>>>
- continuousattributes: HashMap<String,Integer>

Fig. 5

Attribute

- name: String
- indexInDataset: Integer
- variability: Integer
- discernibility_strength: Double
- attribute_vector: ArrayList<String>
- isContinuous: boolean
- numDiscreteValues: int
- min: Double
- max: Double
- discreteValues: ArrayList<Double>

METHOD FOR SEARCHING FOR RELIABLE, SIGNIFICANT AND RELEVANT PATTERNS

SUMMARY OF THE INVENTION

The software system processes through the following high level steps in order to extract reliable, significant and relevant patterns in a classified dataset. First step is to run through preprocessing step in which software system discretizes each continuous attribute of the dataset and checks if there is variability in each attribute. The system removes any attribute, which does not have enough variability to distinguish different records. Next, the system finds the discernibility strength of attributes and then sorts attributes in descending order of discernibility strength. The system then computes the statistics like pattern minimum frequencies and probabilities for each class for the patterns to be generated.

The software system then generates the size 1 patterns of each class. It then checks for both reliability and refinability of the size 1 patterns. The system grows the refinable patterns by increasing the attributes and its values in the pattern by one at a time to find a size 2 pattern. The system then uses the number of pattern occurrences of size 2 pattern to be evaluated as a basis to find the reliable patterns. The system also checks for statistical significance over the size 1 patterns and once again for the refinability of the size 2 patterns. At the completion of growing, the system checks for relevance of the size 1 patterns by obtaining the disjointed record complement set. This is done by removing those records from size 1 patterns that are found in its size 2 sub-patterns. The software system readjusts the pattern statistics of size 1 and removes the non-relevant super-patterns. This process is repeated from size 2 to N. However, for testing significance of a higher sized pattern over all its super-patterns, the system for each reliable pattern, stores the highest probability amongst itself and its super-patterns.

BRIEF DESCRIPTION OF THE DRAWINGS

FIG. 5 depicts the data structure for a Data object.

FIG. 6 depicts the data structure for an Attribute object.

DETAILED DESCRIPTION

The purpose of the invention is to build a system for automatic analysis of large quantities of data to extract all reliable, significant and relevant patterns that occurred in the data for each class of the decision attribute. The invention is in the reduction of search space to do the pattern extraction in an efficient manner while not losing any valid pattern. The system does not use any heuristic to do this and instead evaluates each pattern for reliability, refinability (significantly improving) and relevance through statistical tests. An efficient method is provided that extracts and refines patterns from size 1 up to size N by constantly referencing the record set and performing the tests. The system also provides an option to select top k patterns and how much of a particular class is covered by those top k patterns. The system also provides an optimum number of reliable patterns to cover almost all records (except the outlier instances) for each class. These patterns can then be seen as a kind of summary of the dataset.

Studying historical data and finding patterns has been in existence for a long time. Most of today's data mining or pattern matching techniques in classification or estimation use historical data to train a model for patterns in that data. Due to the computational intensity, these techniques use a range of greedy algorithms such as gradient descent, to identify a pattern and optimize it for a given accuracy (often called as loss function which is minimized).

However, these techniques work well when the data is representative of the population, the variance is well explained and pattern regions are smooth.

Figure 1:
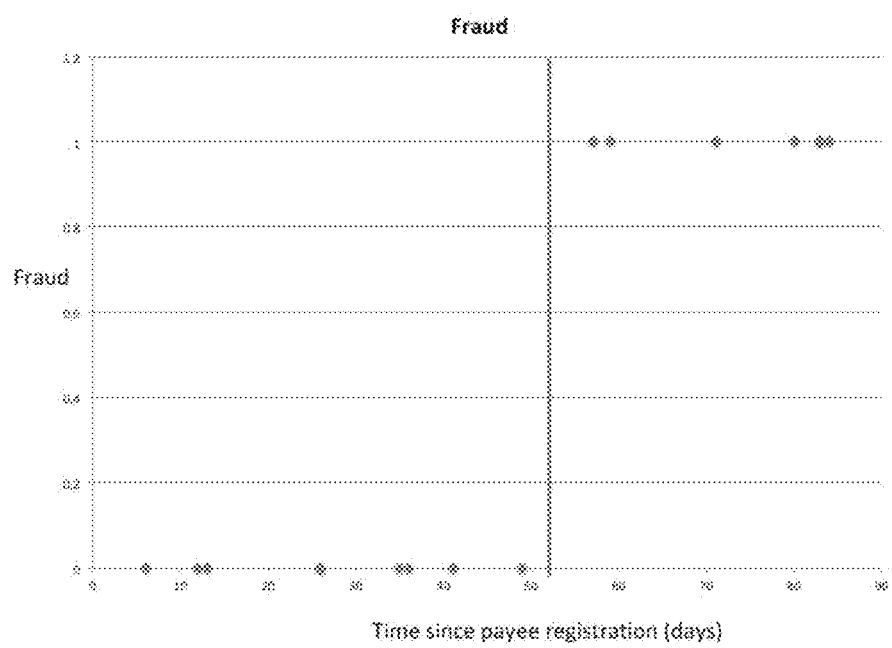
FIG. 1 depicts a graph demarcating a sharp classification, which is possible with the data set.
Figure 2:
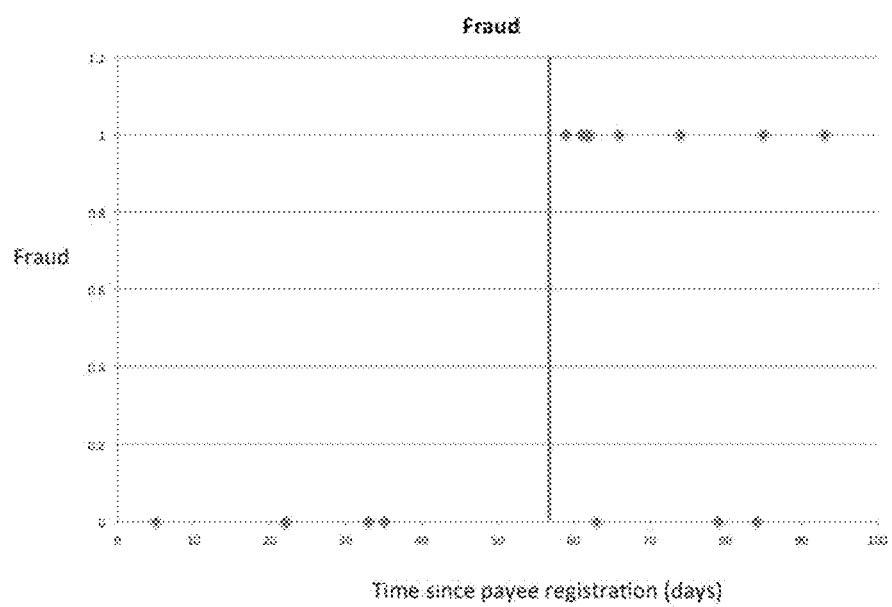
FIG. 2 depicts a graph demarcating a sharp classification, which results in errors in the data set.
Figure 3:
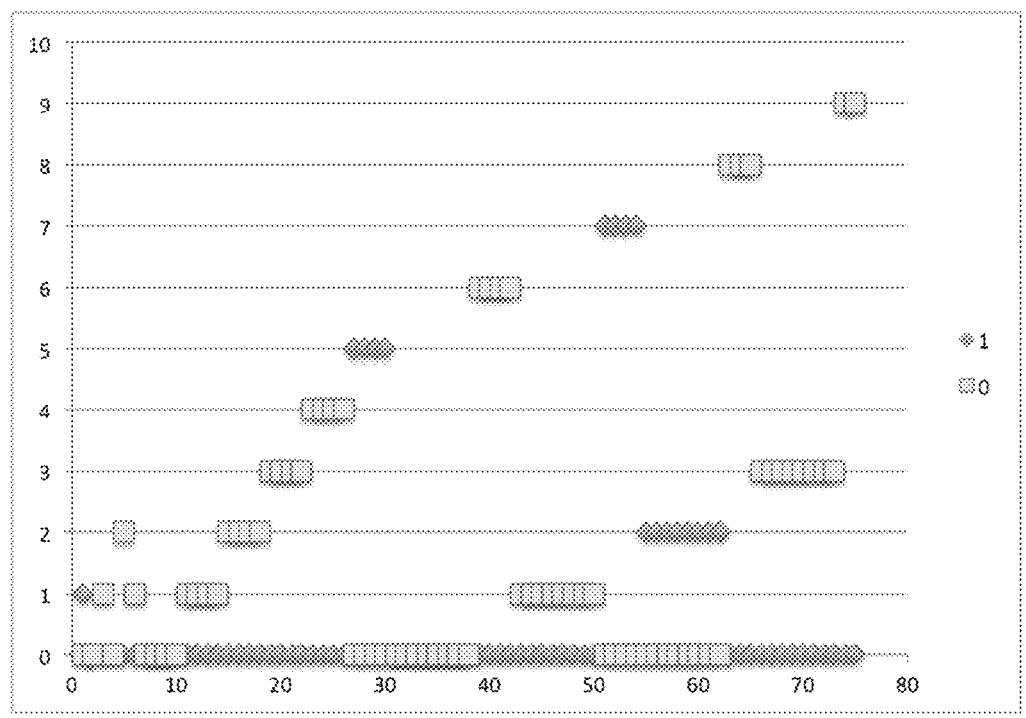
FIG. 3 depicts a rough set where sharp classifications are not possible with elapsed time since the creation of the task (days) as X Axis; Y Axis: time remaining to complete a task (days); 1—Task updated in a day; 0—Task not updated in a day.

For example, contrast the scatter plots for FIG. 1 and FIG. 2. Another data set with a two-way scatter plot is shown in FIG. 3.

The scatter plots reveal how existing techniques fail to work with rough data sets, where a sharp classification or estimation is not possible. In such cases, most techniques cause the error by working on the entire range of values of the attribute as one unit and using a defined loss function to minimize the error.

Even techniques such as decision trees breakdown the range of values of an attribute into intervals and work with the attribute splitting the data. But decision trees do the tree building by considering the full range of attribute values and then prioritizing them using information gain of the attribute. This technique then fails to address which attributes are important and the select values of the attribute that are important in different regions of the data.

As against, these techniques, current pattern searching method does not consider all the values of the attribute in all the regions in the same way. Instead, it tries to identify on the basis of probability, clusters or regions that can densely classify or estimate.

A comparison of the existing techniques with the current pattern searching method is provided below:

| Technique | Description | Advantages | Limitations |
|---|---|---|---|
| Parametric methods e.g. linear regression, logistic regression and variants | Assume a host of parameters including distributions, exogeniety, linearity, homoscedasticity etc. | Work well with continuous and discrete data Open box approach giving attribute importance, direction and magnitude of effect | Struggle when the assumptions are not met which typically is the case with most real world data |
| Non-parametric Assumption free hidden methods e.g. ANN, SVM etc. | Use hyper planes or hidden layers to compute a linear or non-linear transformation of the attribute space | Provide deep learning capabilities and need no assumptions on distributions, co-linearity, linearity etc. | Work only with numeric data. Hidden methods that are difficult to understand and explain |
| Assumption free open methods e.g. Decision Trees | Use decision splits at nodes to classify or estimate. Do not assume any distributions | Easy to understand and explain. Can handle numeric and categorical data but struggles with continuous data | Uses a heuristic or a greedy algorithm that converges the search space |
| Claimed pattern searching method | Uses combinations of attribute spaces and an optimized search method for the significant reliable patterns | Easy to understand and explain. Can handle numeric and categorical data but struggles with continuous data | Computationally intensive despite optimization |

Figure 4:
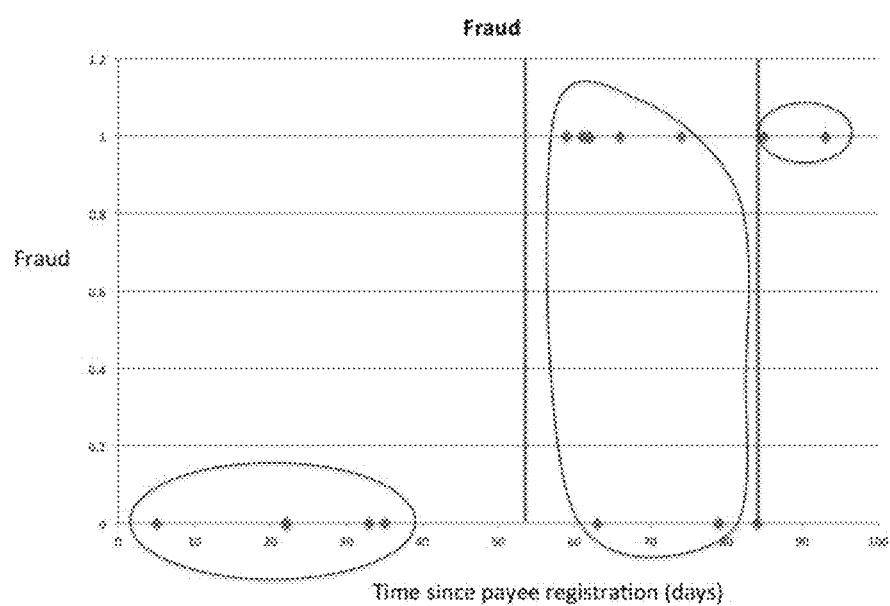
FIG. 4 depicts an identification of dense regions or clusters, which have different behavior.

FIG. 4 represents dense regions or clusters in a fraud dataset.

Identification of such clusters requires enumerating all probable patterns in the dataset considering all or some of the attributes and their values.

Prior research work although dealt with such enumeration, stopped short of evaluating all of the dataset due to the constraints of time and space complexity, which forced them to use a greedy approach or a heuristic method to quickly converge.

Jianping Zhang, Brent M. Han, Ali R. Hadjarian et al (Ranking With Learned Rules, US 20100161526 A1) came up with an approach which uses a rough rule to initially classify and reduce the number of rows in the dataset for the remaining rules. Such methods while reduce the computational intensity dramatically, tend to over fit the rules to existing occurred data.

Mary Ann Roth, Blayne Harold CHARD, Yannick Saillet, Harald Clyde Smith et al (Association rules and tree classifications U.S. Pat. No. 7,836,004 B2) used a first data mining algorithm to generate a set of plurality of fields as a rule and a second data mining algorithm to generate the rule set. However, the work does not give a method to reduce the search space for the rule set and does not give a distributed method in which the rule sets are generated, evaluated and applied.

Friedemann Schwenkreis (Sequential patterns within data of inhomogeneous type U.S. Pat. No. 6,553,359 B1) uses a sequential pattern with APRIORI knowledge to build the data and then the rule set. But does not give a method to intelligently build the rule set and explore all probable rule sets.

Rakesh Agrawal, Ching-Tien Ho, Mohammed J. Zaki et al (Parallel classification for data mining in a shared-memory multiprocessor system U.S. Pat. No. 6,230,151 B1) discussed approaches for parallelizing decision tree kind of classifiers where the processors are distributed but data is held in memory and a specific attribute is used to parallelize the splits and a cooperation engine in memory determines the best splits for all the attributes put together. But this still does not use multi-attribute combinations or explore all probable patterns.

The complexity can be understood from the fact that, in a dataset with m attributes and n as average attribute cardinality, the number of patterns that need to be evaluated goes up to $(1+n)^m-1$. So for a dataset with 30 attributes and average cardinality of 10, the number of patterns would be $31^{10} \sim 8 \times 10^{14}$ or 800 trillion. This requires not only a an efficient approach but to quickly and accurately reduce the number of patterns to be evaluated through identification of dense regions and focusing on such regions first and then going into the sparse regions based on the usefulness and validity of classifying or estimating error.

Definitions

Let DS be dataset with attribute set $A=\{C_1, C_2, \ldots, C_n, D\}$ where $C_1, C_2, \ldots, C_n$ are condition attributes and D is a decision attribute. Let $\{c_{ji}\}$ be the range of Condition attribute $C_j$. Let $\{d_l\}$ be the range of D where $l=1$ to m where m is the number of classes. For a value i of l, a record in a dataset is called a class $d_i$ record (if its decision attribute value is $d_i$. Let $P=(P1, P2, \ldots, Pk)$ is a sub sequence of $(1, 2, 3, \ldots, n)$ and $P=\{C_{P1}, C_{P2}, \ldots, C_{Pk}\}$ be a non-empty condition attribute subset of A. The discernibility of an attribute is the weighted average positive difference (lift) between the class probability at a particular value of the attribute compared to the class probability across all values. This is done for all classes with improved probabilities. The weights are equal to the frequency of the attribute value.

A group of data records having same values for a subset of condition attributes $P=\{C_{P1}, C_{P2}, \ldots, C_{Pk}\}$ of the data is called a pattern.

Mathematically, the set of all records satisfying certain conditions $C_{Pi}(record)=c_{pi1}$, where $c_{pi1}$ is a fixed value in the range of Condition attribute $C_{pi}$ form a pattern $((C_{P1}, C_{P2}, \ldots, C_{pk}), (C_{p11}, C_{p21}, \ldots, C_{pk1}))$.

The size of the pattern is the number of attributes involved in its definition.

Frequency of a pattern in a dataset is the number of records satisfying that pattern's conditions.

A class is majority in a pattern if more records belong to that class than other classes.

If class A is existing in a pattern, that pattern is a class pattern of the class A.

The class probability in the pattern is the estimated lower bound of the confidence interval of the population probability at the given confidence levels from the class pattern for that class.

A class pattern is called a reliable pattern for class $d_1$ if it has enough frequency, so that the estimated population class probability is more than a given minimum probability. This is checked with comparison of estimated minimum value of confidence interval of the population for class $d_1$ with confidence c with minimum probability x expected in the population. Thus class frequency to be of minimum n which satisfies $n/(n+T_c^2)>x$ where $T_c$ is the inverse cumulative t distribution with degrees of freedom n−1 for the given confidence levels.

Pattern A is a sub-pattern of B, if the pattern attribute set of B is a subset of pattern attribute set of A and all the conditions on pattern attributes of B holds on A too. In other words, A is a sub pattern of pattern B, if the record set of pattern A is a subset of record set of pattern B. B is a super-pattern of A.

Sub-pattern of A of pattern B is called a significant pattern if it has significantly high class probability for at least one class than pattern B. The significantly high class probability is done over a test where $p_{sub\text{-}pattern} > p_{super\text{-}pattern} + T_{(1-s)} \sqrt{p_{super\text{-}pattern}(1 - p_{super\text{-}pattern})/n}$ A pattern A is called a relevant pattern if the complement record set of the Pattern A from all its sub patterns, is still a reliable pattern. For example, if pattern A has a set of records $r_1$ to $r_n$ and pattern B1, B2, B3 created as an addition of attribute values of B on A etc. has a subset of records as $\{r_k, \ldots r_l\}$, then the disjointed complement records of super pattern A is $\{r_1, \ldots, r_{k-1}, r_{l+1}, \ldots r_n\}$. A pattern's statistical parameters are always adjusted to its complement record set of the pattern A.

Pattern A can be refinable pattern if a sub pattern B of A that is reliable, has a significantly higher class probability for at least one class can be found. This is possible when pattern A has a minimum frequency for at least one class to become a reliable pattern and if that class probability can be improved significantly through the test $$1 < p + T_c \sqrt{\frac{p(1-p)}{n}}$$

where p is the current class probability and n the frequency of that pattern.

All definitions recited herein are intended for educational purposes to aid the reader in understanding the principles of the invention and the concepts contributed by the inventor to furthering the art, and are to be construed as being without limitation to such specifically definitions.

Mathematical Basis

This portion of the disclosure discusses the mathematical underpinnings of how many patterns need to be evaluated in order, reliable patterns, significant patterns, refinability, relevancy and low variability attributes.

In principle, a pattern is a subset of condition attributes and an instance of a value-pair for those attributes. If a dataset has m condition attributes and n as average attribute cardinality, the number of patterns that need to be evaluated goes up to $(1+n)^m - 1$.

a) Discretization

In mathematics, discretization concerns the process of transferring continuous values into discrete counterparts. This process is usually carried out as a first step toward making them suitable for numerical evaluation and implementation on digital computers. Such two discretization techniques which are supported in the system are uniform scaling into equal width bins or equal frequency bins. However, the system supports any other discretization techniques as well. In order, to achieve best results with discretization, it is important to preserve the discernibility of the attribute. Techniques are available such as mutual information based discretization or through discernibility matrix in rough sets, which preserves the discernibility of the attributes. The system works even if no discretization is performed but loses patterns due to low frequencies of continuous data.

b) Low Variability Attributes

At the pre-processing stage, the system checks whether an attribute has enough variability to distinguish different records. For example, if an attribute has only one possible value, that attribute will not be useful in generating interesting class patterns. Even if one value of an attribute highly dominates in the record set, then also it is not useful in generating class patterns. Such attributes will be removed from the dataset before the system starts finding patterns.

For each attribute in the attribute set of the dataset, the system can compute its variability and discernibility strength. Initially, the system assigns variability to 1 and the discernibility strength to zero for all attributes. The system updates for each attribute its variability to 0 and thus removes that attribute from further analysis, if the attribute taking its dominant value has a probability that has a confidence interval that contains 1 on one side at a given confidence level $$1 < p + T_c \sqrt{\frac{p(1-p)}{n}}$$

where p is the probability of the attribute taking its dominant value and n the number of records in the dataset The discernibility strength is computed as follows. All the records in the data set are partitioned into groups so that all the records in a group have the same attribute value for that attribute. The system computes the class probability distribution for each partition. In each partition of records, the system takes out those classes, which have higher probabilities than in the entire dataset (effectively, the lift, the attribute value gives on the class probability over the entire attribute) and compute the discernibility strength as average increment of class probability of each record belonging to those classes. The attributes are then sorted in descending order of discernibility strength.

c) Pattern Occurrence

Out of $(1+n)^m - 1$, the patterns appear in the dataset are interesting, because the system can validate each of those patterns.

Each record in a dataset can generate $2^m - 1$ patterns from size 1 to size n. If the dataset has 1 records then $1(2^m - 1)$ patterns will be generated.

If two records have same values for some of the attributes, then some of the patterns generated by them are repeated. If a pattern is not repeated, statistically such pattern will not bring any conclusive understanding on new data. The system considers those patterns, which will repeatedly occur to analyze the data and get statistically conclusive understanding.

Hence, the system deals with less than $1(2^m - 1)$ patterns for analysis of data. In addition, a pattern may contain other patterns fully or wholly when extended. In other words, the patterns represent the same set of instances. These are also removed from analysis.

d) Reliable Patterns

Class pattern is a reliable pattern if its estimated lowest value of the confidence interval of that class probability in the entire population of records is above the desired minimum probability. To explain the reliable pattern concept, a dataset, which contains observed instances (records) of a live system, does not consist of all possible instances that can occur. New instances may occur in future. Even if all the patterns of a given dataset are found, they can only explain instances in that dataset. But it is expected to find patterns in the entire possible instances. If all the patterns of a random sample data are found, it raises a question on how reliable the patterns will be on the entire population of records.

The system must find reliable statistical inferences to be made about the validity of any patterns discovered. The system uses some statistical tests to estimate the lowest probability with a desired confidence of each pattern produced based on available dataset if it is to be considered a pattern on the entire population of records. Pattern class probability for a particular class means it is the lowest estimated class probability of the pattern for that class with a desired confidence.

In fact, the record set of each pattern in the dataset is a sample of record set of that pattern in the entire population. The system statistically analyzes each pattern in the entire population through these samples. The entire population is huge and regardless of its distribution, the system estimates the population parameters through samples. (Reference: Central limit theorem (CLT))

The system assumes that the number of records for each pattern in the dataset is small. So, the system uses T distribution to estimate pattern parameters of the record set of the entire population through these samples. In probability and statistics, T distribution is a member of a family of continuous probability distributions that arises when estimating the mean of a normally distributed population in situations where the sample size is small. T distribution almost behaves like normal distribution when the size of the sample is high.

If there is a sample of size n, collected from a population with class $d_1$ probability p, then the sample maximum class $d_1$ probability $p_s$ with confidence c is $p+T_c\sqrt{p(1-p)/n}$ where $T_c$ is the T distribution inverse cumulative probability value with n−1 degrees of freedom and confidence c.

When the system finds a sample record of a pattern, the system can then compute the class probabilities of that sample. If the system estimates population class probabilities with confidence c through this sample, it has to find out how conclusive they are in reality. In other words, the system needs to estimate minimum population class probabilities with confidence c by using this sample.

The system doesn't know how good of sample it has from the dataset to estimate the population class probabilities. To ensure calculation works even in the worst case, the system assumes the sample has maximum possible class probabilities with confidence c. Then population class probability can be computed for class $d_1$ as:

$$p_s = p + T_c\sqrt{p(1-p)/n}.$$

By solving this equation for p, system gets:

$$p = \frac{(2p_s + (T_c^2/n)) - \sqrt{(2p_s + (T_c^2/n))^2 + 4(1+(T_c^2/n))p_s^2}}{2(1+(T_c^2/n))}$$

The estimated minimum population class $d_1$ probability will be more than p with confidence c.

As n becomes larger then p will be equal to $p_s$.

If the estimated minimum population class $d_1$ probability is to be more than x, it has to satisfy p>x.

Suppose sample class $d_1$ probability is 1 then $p_s=p+T_c\sqrt{p(1-p)/n}$ can be re-written as $1=p+T_c\sqrt{p(1-p)/n}$ and by solving for p, the equation results in:

$$p=n/(n+T_c^2) \text{ and } p>x \text{ implies } n/(n+T_c^2)>x.$$

If the system has a sample of record set of a pattern with class $d_1$ probability 1, it has to satisfy $n/(n+T_c^2)>x$ to have estimated minimum population class $d_1$ probability x with confidence c. Therefore even if a sample has class $d_1$ probability 1 with $n/(n+T_c^2) \le x$, the system cannot conclusively calculate that the estimated minimum population class $d_1$ probability will be more than x. Therefore, if a pattern to be an interesting pattern for class $d_1$ with estimated minimum population class $d_1$ probability x with confidence c, then it's class frequency to be of minimum n which satisfies $n/(n+T_c^2)>x$.

For each class in the dataset, an interesting class pattern should have estimated population minimum class $d_1$ probability more than x, which is set at the time of defining interesting class pattern for each dataset and class.

A pattern to be a reliable pattern, it's class frequency n should satisfy $n/(n+T_c^2)>x$. Any sub pattern will have lesser class frequencies than the super pattern. So, if a pattern is not meeting minimum class frequency, any refinement of the pattern also doesn't meet minimum class frequency.

The system can stop generating refined patterns for patterns if all its class frequencies $n_1$, satisfies $n_1/(n_1+T_c^2) \le x$.

e) Refinable Patterns

Pattern A can be refinable pattern if a sub pattern B of A that is reliable has a significantly higher class probability for at least one class can be found.

Mathematically, if the pattern class $d_1$ frequency is n, which should be above the minimum frequency, then any sample of size n of the pattern can be significantly different with respect to class $d_1$ only if sample probability for class $d_1$, $p_{sample} > p+T_{(1-s)}\sqrt{p(1-p)/n}$ where s is significance parameter.

The maximum possible value for $p_{sample}$ is 1 and if $$1 < p + T_c\sqrt{\frac{p(1-p)}{n}},$$

then no significantly different with respect to class $d_k$ can be found.

Hence, the system can stop generating all those sub patterns with probability $$1 < p + T_c\sqrt{\frac{p(1-p)}{n}}.$$

Hence, the system can stop generating further sub-patterns for patterns if all its class probabilities satisfy $p_s \le p+T_c\sqrt{p(1-p)/n_1}$ where $n_1$ is the class $d_1$ frequency of the pattern.

f) Significant Patterns

Sub-pattern of A of pattern B is called a significant pattern if it has significantly high class probability for pattern class than pattern B. The significantly high class probability is done over a test where $p_{sub-pattern} > p_{super-pattern} + T_{(1-s)}\sqrt{p_{super-pattern}(1-p_{super-pattern})/n}$. For the purpose of minimizing the number of comparisons, the sub-pattern of size k is compared with the reliable super-patterns of size k−1. The system for each reliable pattern, stores the highest probability amongst itself and its super-patterns. Therefore, a comparison with reliable patterns of size k−1 compares the sub-pattern effectively with all its super-patterns.

System Implementation

Figure 11:
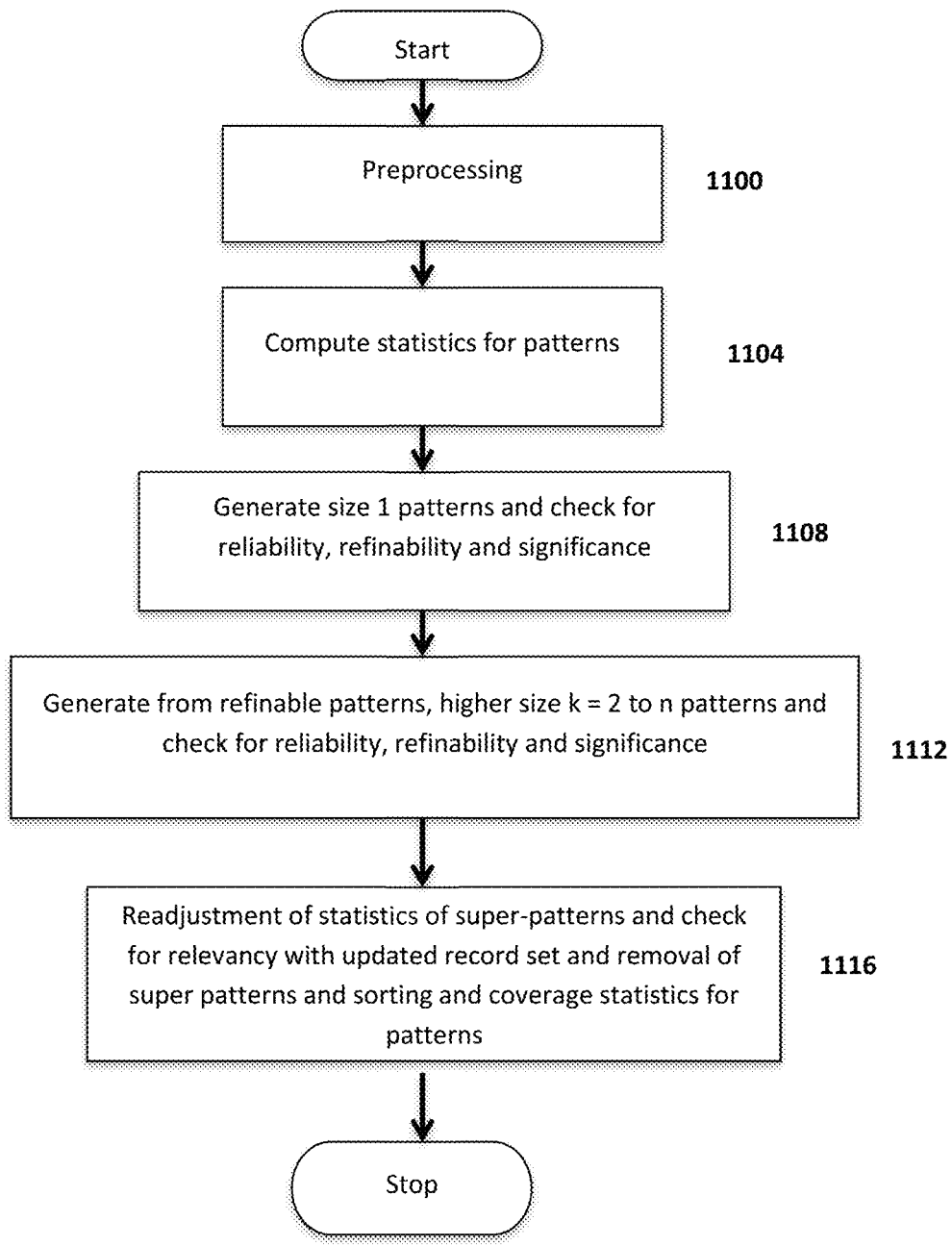
FIG. 11 depicts a flow diagram for an overall process for method for reduction in search space for finding reliable patterns.
Figure 17:
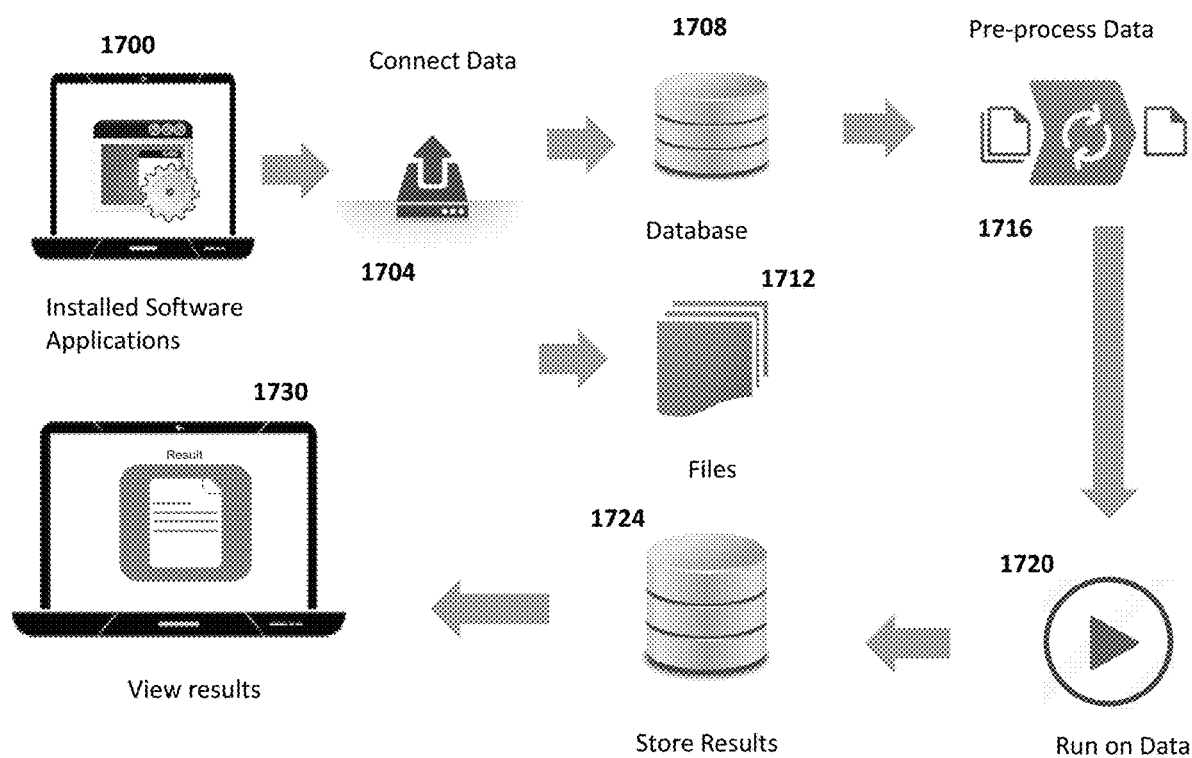
FIG. 17 depicts a high level computer implementation diagram for processing the data for finding patterns.

FIG. 17 shows the computer implemented view 1700 of the process to extract patterns. The system connects to the database or files 1704 and loads the data to process into the database 1708 and files 1712 on the system. The system pre-processes this data 1716. The system runs the extraction of patterns by running the data 1720. Finally, the system stores the results into the database 1724 and displays the results 1730. FIG. 11 shows another view of how the software system processes through the following high level steps in order to extract reliable, significant and relevant patterns. The system will be provided the data set (record set) in which the patterns are to be found, list of the continuous attributes in the data set along with desired discretized values for each continuous attribute through discretization process, the required minimum class probability p, the minimum confidence c for its class probability and the significance s for patterns to be found and the directory where the patterns are to be stored. Once the system receives the input values it creates a data object with these values. FIG. 5 shows how the data structure for the data object would look like.

First step is to run through preprocessing step in which software system discretizes each continuous attribute of the dataset and checks if there is variability in attributes 1100. FIG. 6 shows the data structure of the Attribute object in the system. The system removes any attributes, which do not have enough variability to distinguish different records. Next, the system finds the discernibility strength of attributes and then sorts attributes in descending order of discernibility strength. The system then computes the statistics like pattern minimum frequencies and probabilities for each class for the patterns to be generated 1104.

Figure 7:
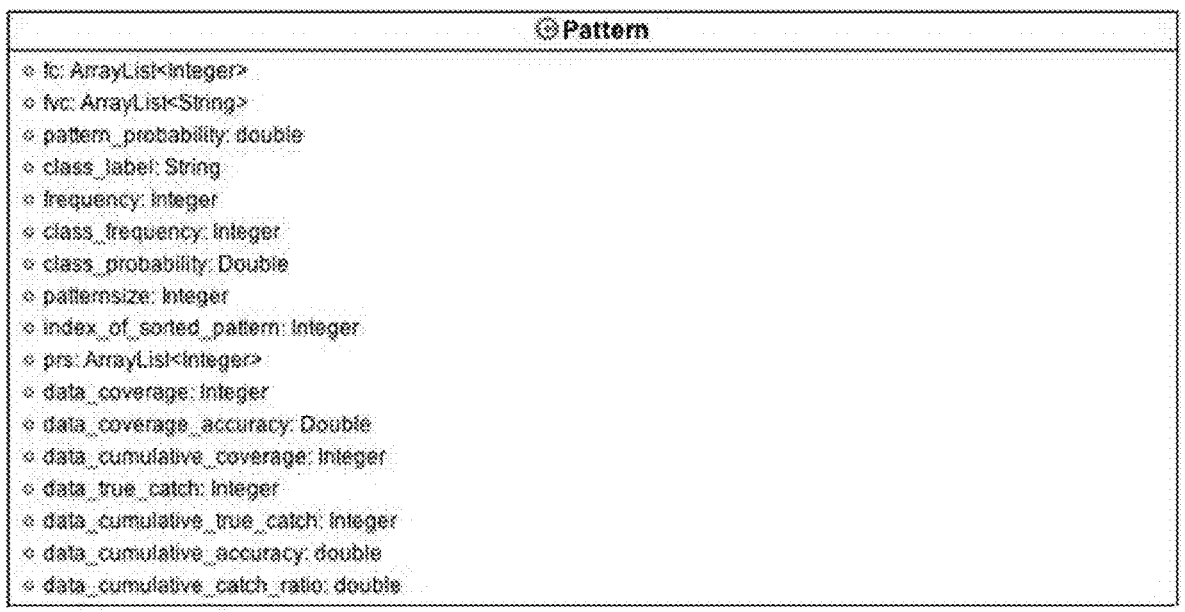
FIG. 7 depicts the data structure for a Pattern object.

The software system then generates the size 1 patterns 1108. It then checks for both reliability and refinability of the size 1 patterns. FIG. 7 shows how a pattern is represented in the system. The system grows the refinable patterns by increasing the attributes and its values in the pattern by one at a time to find a size 2 pattern. The system checks if the size 2 pattern class frequencies are the same as size 1 pattern and removes the size 2 pattern because it is fully containing the size 1 pattern. The system then uses the number of pattern occurrences of size 2 pattern to be evaluated as a basis to find the reliable patterns 1112. The system also checks for statistical significance over the size 1 patterns and once again for the refinability of the size 2 patterns. At the completion of growing, the system checks for relevance of the size 1 patterns by obtaining the disjointed record complement set. This is done by removing those records from size 1 patterns that are found in its size 2 sub-patterns 1116. The software system readjusts the pattern statistics of size 1 and removes the non-relevant super-patterns. This process is repeated from size 2 to N. However, for testing significance of a higher sized pattern over all its super-patterns, the system for each reliable pattern, stores the highest probability amongst itself and its super-patterns.

(A) Preprocessing

Figure 12:
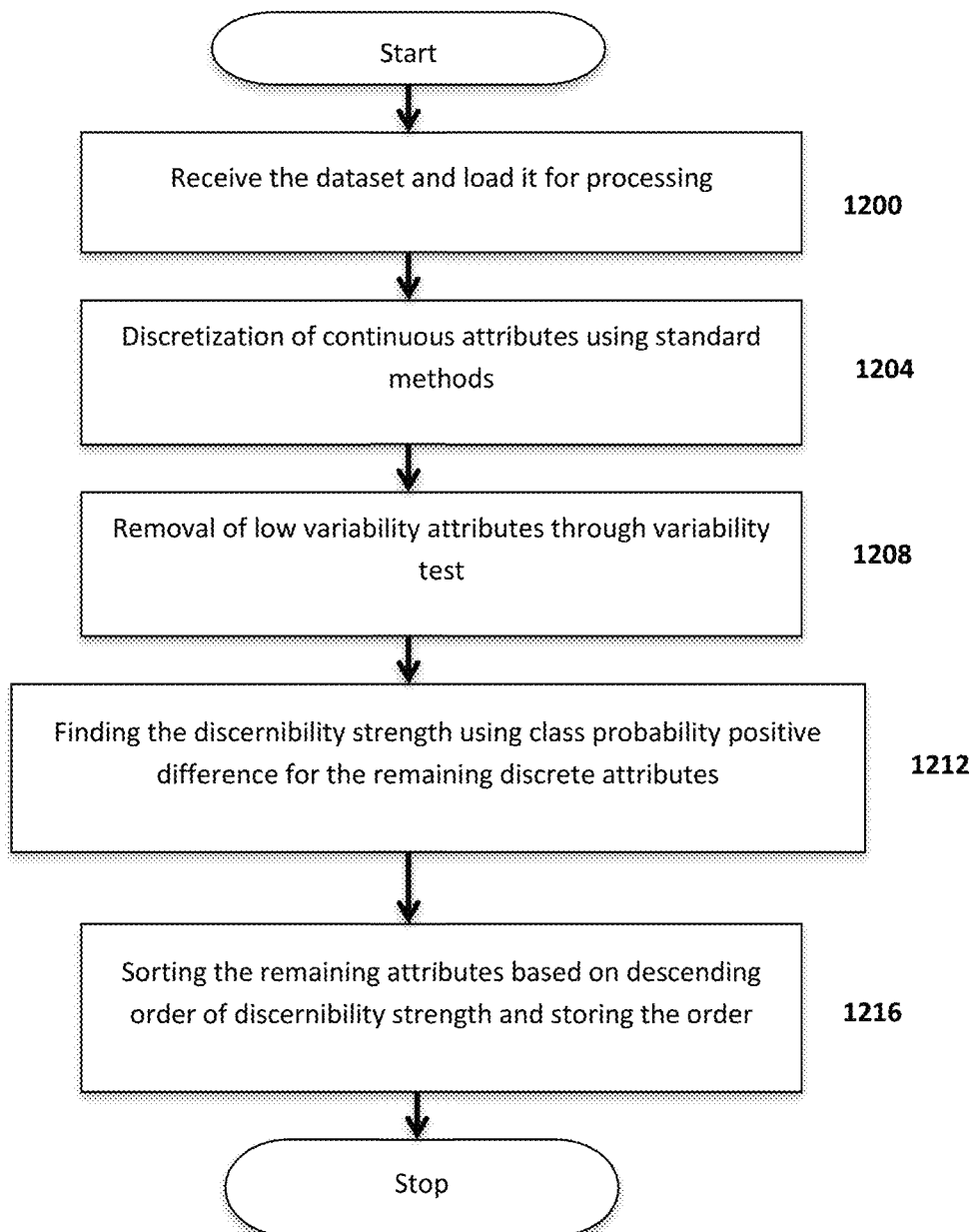
FIG. 12 depicts a flow diagram for preprocessing the data.

FIG. 12 shows the pre-processing portion of the software system. After the system loads the dataset 1200, the software system will discretize each attribute of the dataset by using standard discretization techniques available 1204. The system checks whether an attribute has enough variability to distinguish different records 1208. Such attributes will be removed from the dataset before the system starts finding patterns.

The system computes the overall class distribution in the dataset by scanning the entire set of records in the data set. It builds a hashmap which is called class distribution hashmap of the data set. Class distribution hashmap of the data set is a hash map with key as class and value as frequency of that class records. An example class distribution hashmap is below:

| Class ($d_1$) | Frequency of Class ($d_1$) |
|---|---|
| 1 | 700 |
| 0 | 9300 |

When it scans each record, it updates the class frequency if the map already has that class, or adds a new entry with that class as frequency 1. The entire dataset can be considered as a pattern of size 0. By using the class distribution hashmap, the system computes the class probabilities of every class. If a pattern is to be reliable, then the probability for at least one class in that pattern should be significantly higher than the minimum desired probability given.

While scanning each record in the data set the system also creates attribute objects for each attribute including the decision attribute in the dataset and adds them to the attribute set of the data object.

The system takes each attribute vector along the decision attribute vector and scans each attribute value and stores them in to an attribute value distribution hashmap with key as attribute value and value as another hashmap which is called class distribution hashmap. An example attribute value distribution hashmap is as follows:

| Attribute Value | Class Distribution |
|---|---|
| IPKnown_0 | (0,6800) (1,200) |
| IP_Known_1 | (0,2500) (1,500) |

Figure 10:
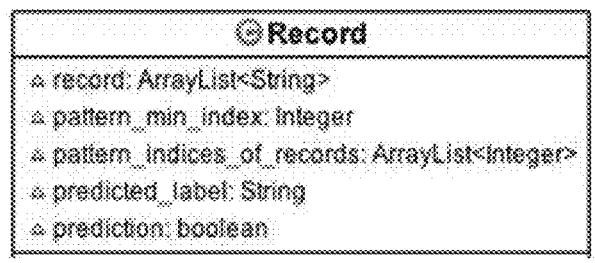
FIG. 10 depicts the data structure of a Record object.

To compute the frequency of each attribute value, the system takes corresponding entry in the attribute value distribution hashmap and sums all the frequencies for each entry in its class distribution hashmap. FIG. 10 shows the data structure of a record object, which is stored in the class distribution hashmap.

The system starts with each attribute having a variability of 1. To compute the probability that the attribute can take a particular value, the system divides the frequency of that attribute value by the size of the attribute vector. The system takes each value of the attribute one by one and checks whether the confidence interval of the probability that the attribute can take that value contains 1 and if so, it updates the attribute variability to 0. The system stops checking for other attribute values. The system removes the attributes for which the variability of the attribute is updated to 0.

The system takes corresponding class distribution hashmap for each entry in the value distribution hashmap and for each class it computes the class probability for that attribute value by dividing the class frequency by the frequency of that attribute value.

If the system finds the class probability is more than the class probability in the entire dataset, it adds the product of the positive difference in class probability and the class frequency as equal to the lift in class probabilities. Once it exhausts all the entries in the value distribution hashmap, it divides the lift in class probabilities by the size of the attribute vector and assigns the resulting value to the discernibility strength of the attribute 1212.

Finally, it sorts the attributes in the attribute set in the data object in the order of descending discernibility strength of the attribute 1216.

Now a record in the dataset means ordered collection of attribute values stored at same index in each attribute.

(B) Computing the Statistics for the Patterns to be Generated.

Figure 13:
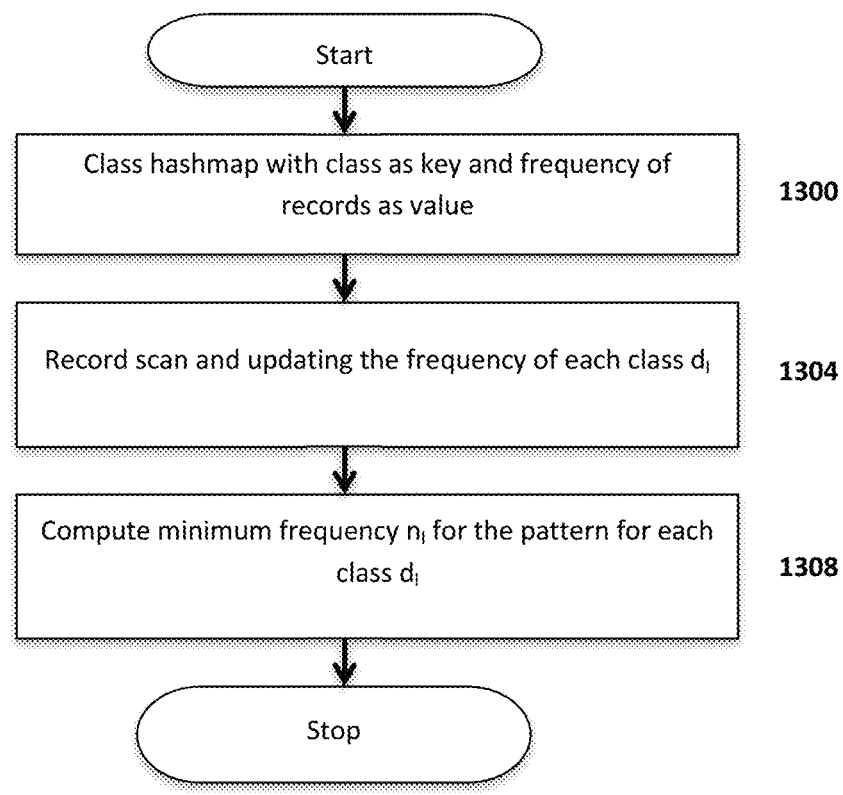
FIG. 13 depicts a flow diagram for computing statistics for patterns.

FIG. 13 shows the flow for computing the statistics for the generated patterns. The system computes the required minimum frequency n for each class $d_1$ pattern in the dataset to be a reliable pattern 1300. The required minimum frequency n for the observed pattern should satisfy $n/(n+T_c^2) \leq x$ where T is the T-inverse cumulative distribution with n−1 degrees of freedom. Here x is the desired minimum probability. Initially, the system assigns value 1 for n and then it increments n until it satisfies $n/(n+T_c^2) \leq 1304$.

Each record in the dataset will generate $2^n-1$ probable patterns if it has n condition attributes.

All these probable patterns exist in the dataset. It has to be verified whether these patterns have higher than the desired minimum frequency n for at least one class $d_1$ and bring reliability to the pattern 1308.

(C) Generating the Size 1 Significant Patterns

Figure 14:
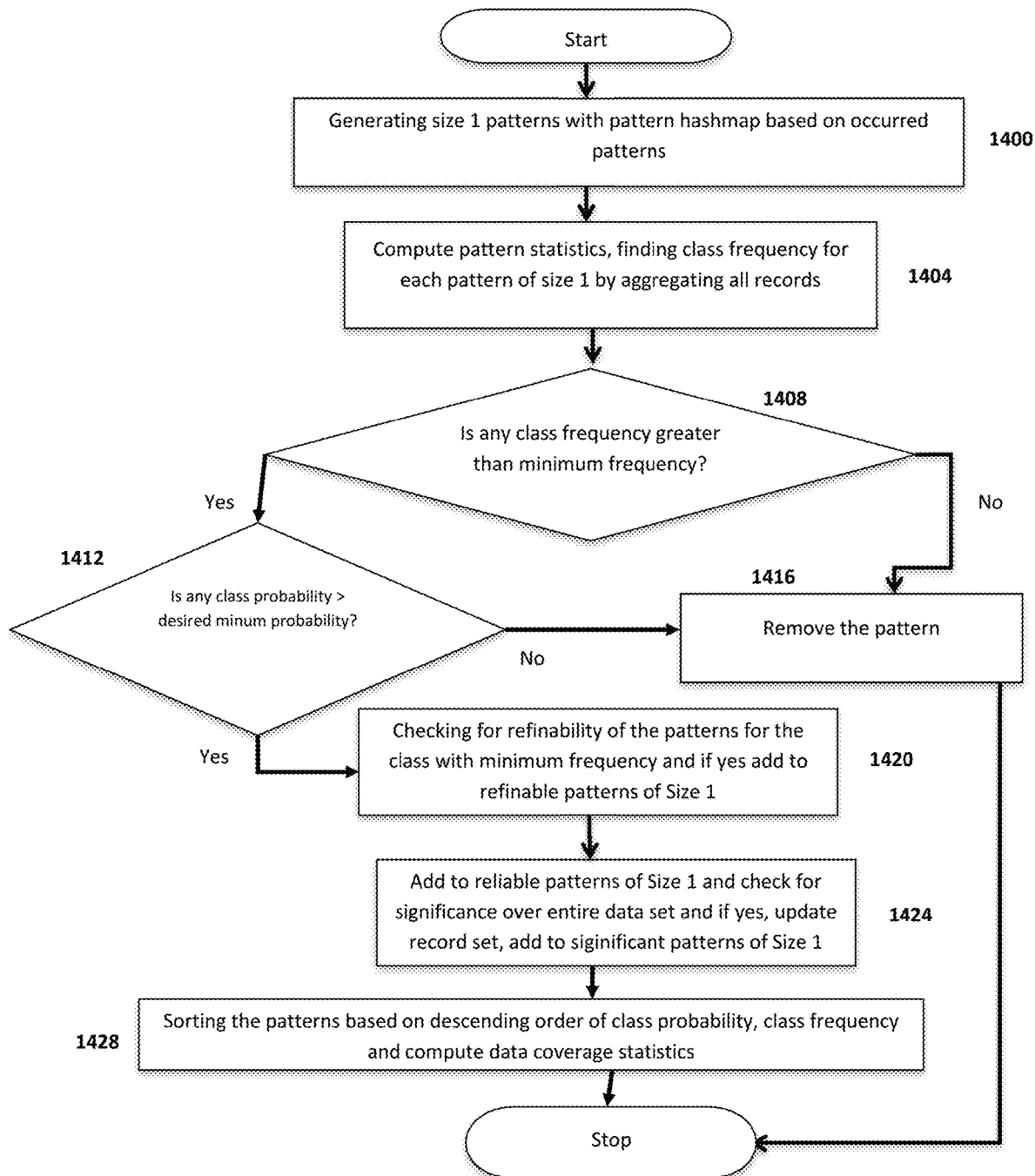
FIG. 14 depicts a flow diagram for generating the size 1 patterns.

FIG. 14 shows the flow for generating the size 1 significant patterns. In the first iteration, all the size 1 patterns are found by scanning all values of each attribute. Then each pattern is checked whether it is reliable and to extract all such reliable patterns. It also checks each pattern on whether it has scope to be refined further and extract all those patterns that can be refined further.

To do that, first the system takes the first attribute of the dataset and form all possible patterns 1400 of size 1 like {(Ci), (xi1)}, {(Ci), (xi2))}, . . . , {(Ci), (xin)}. Then each pattern is stored in a hashmap which is called pattern hashmap. Pattern hashmap is a hash map with key being the attribute value $(x_{i1})$ where $x_{i1}$ is one of the values that attribute $C_i$ takes, and the value as an object PatternExtractor.

Figure 8:
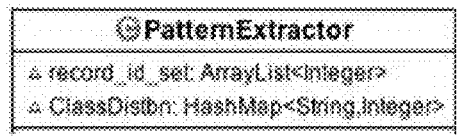
FIG. 8 depicts the data structure for a PatternExtractor object.

FIG. 8 shows an example data structure for the Pattern Extractor. The Pattern Extractor holds list of indices of the attribute vector having the value equal to the key and a hashmap which is called class distribution hashmap.

An example pattern hashmap is as follows:

| Attribute Value | Pattern Extractor |
| --- | --- |
| 0 | (record id set: [1, 2, 3, 7, 9, . . . , 10000], class distribution hashmap for record id set) |
| 1 | (record id set: [4, 5, 6, 8, . . . , 9999], class distribution hashmap for record id set) |

This class distribution hashmap is updated from the decision attribute by looking at the values at the corresponding list of indices of the Pattern Extractor. In other words <$(x_{i1})$, <PatternExtractor>> are stored in pattern hashmap for all $x_{i1}$ in the attribute vector of the attribute $C_i$. The class distribution hashmap will have the structure like <$(d_1)$, frequency of $d_1$ for $C_i=x_{i1}$ in the dataset>.

The system takes each entry in the pattern hashmap and evaluates whether a reliable pattern can be extracted out of that. For each entry in the hashmap the system finds out the frequency of pattern in the dataset 1404. For each entry in the pattern hashmap, the system creates a pattern class probability distribution hashmap with key as class and value as the probability of that class for that pattern. Now for each class in the dataset the system estimates the class population probability of that pattern and updates the pattern class probability distribution hashmap. Now the system checks whether the pattern has class frequency more than the required minimum frequency 1408 to be considered of that class pattern, if yes, by using T distribution, it estimates the pattern class probability in the population of entire set of records. If its estimated class probability is higher than the required minimum class probability of that class, the system adds it to the reliable patterns of size 1 of that class 1412.

Figure 9:
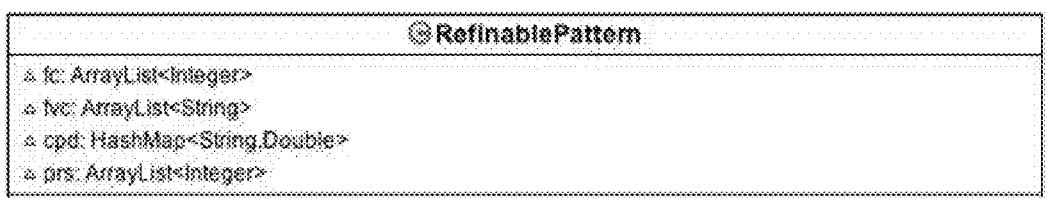
FIG. 9 depicts the data structure of a RefinablePattern object.

Then it checks by using T distribution, whether it's class probability is significantly higher than the class probability of that class in the entire dataset. If it turns out significant then the system attaches the list of records the pattern covers to the pattern and adds it to the significant patterns of size 1 of that class in the data object 1424. Further it checks whether the pattern has further scope to be refined if yes it adds the pattern to refinable patterns of the data object if it is not added already to that 1420. FIG. 9 shows the data structure of a refinable pattern object in the system.

Once all the significant patterns of size 1 are found for each class the system will sort them according to the high class probability 1428 and high class frequency and add all the sorted patterns to the data object. Then the system computes the cumulative coverage of records in the dataset and cumulative class probability at each pattern in the sorted order. The process of computing the cumulative coverage of records in the dataset and cumulative class probability at each pattern in the sorted order will be explained later clearly in section (F).

Pseudo Code to generate size 1 patterns:

```
01) Generate size_1_patterns(Data)
02) For all attributes (A) in Data{
       build pattern hash map of A with key as attribute value and
       value as Pattern Extractor. (Pattern Extractor holds the
       class distribution for that attribute value in the Data and
       the set of records having that attribute value)
       Take each entry in the pattern hash map and generate
       patterns of size 1.
03)    For all patterns (P) of size 1{
           For all classes c in Data{
               if(class c frequency of P > required minimum class
               c frequency and class c estimated probability of P >
               required minimum class c probability) {
04)                add P to reliable patterns of size 1 of class c}
05)            if(pattern has scope to be refined further) {
                   add P to Refinable Patterns of size 1 if not already added
                   to refinable pattern}
                   if(class c estimated probability of P is significantly
                   higher than the class c probability in the Data) {
06)                    update the pattern record set (PRS) IDs from pattern hashmap
                       of A.
07)                    add P to significant patterns of size 1 of class c
                   }
               }
           }
       }
```

(D) Generating the Size k Significant Patterns for k=2 to n.

Figure 15:
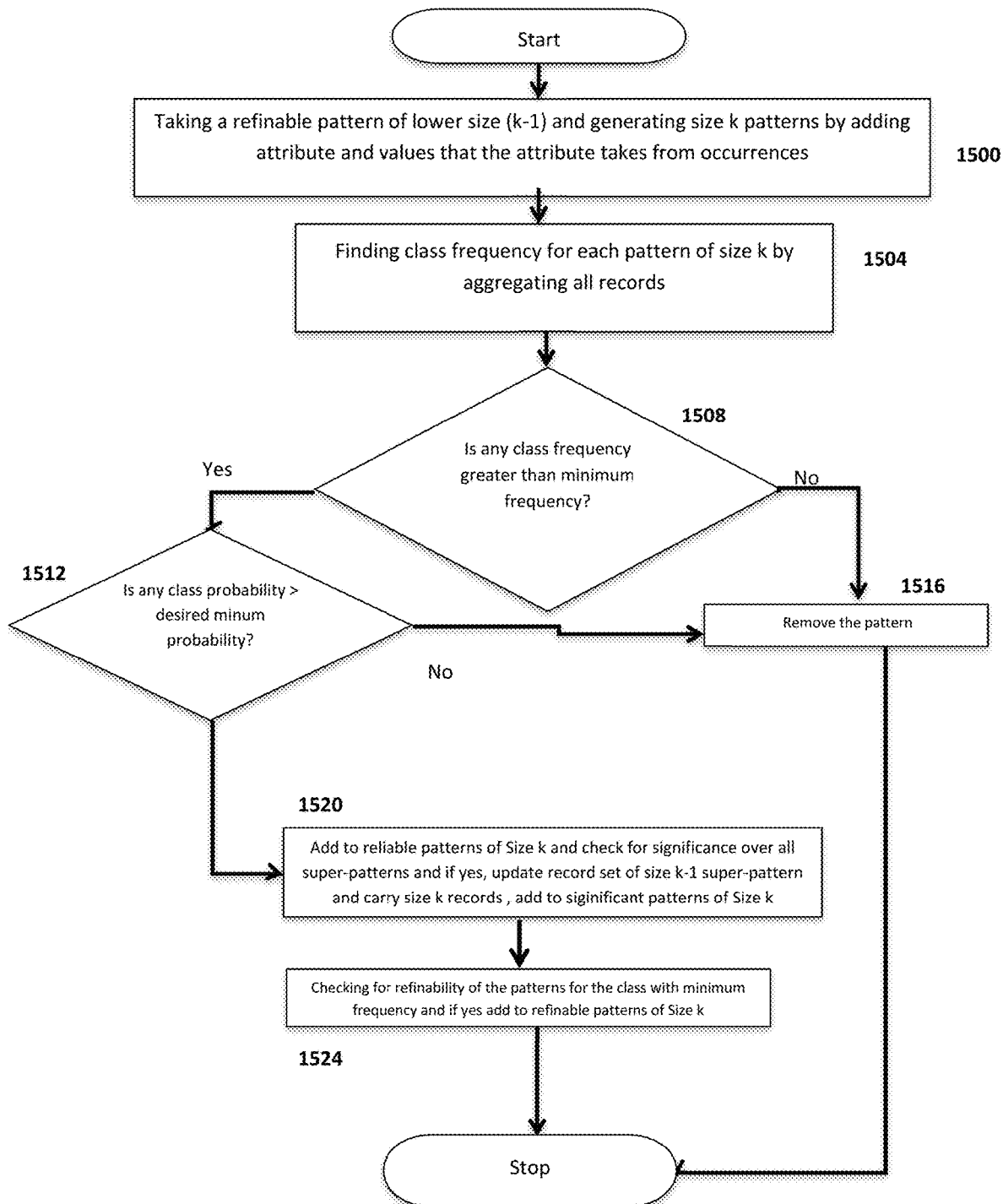
FIG. 15 depicts a flow diagram for generating the size k patterns.

FIG. 15 shows the flow for size k patterns. Method of refining the pattern: The system refines a pattern by adding one more attribute and one of its values that occur with the existing pattern 1500. If the 'to be' added attribute has 'n' unique values occurring with the existing pattern, then there are n new refined patterns. Similarly, all the remaining attributes with a higher index than the current index are added one at a time. Since the attribute indices of a pattern are sorted, the system can add only those attributes which have index in the attribute set more than the index of the last attribute of the attribute combination of the pattern. Each refinable pattern has the set of indices of records in which the pattern occurs. It means all those records will have same attribute values for the pattern attribute combination.

EXAMPLE

Consider a size 1 refinable pattern which has its attribute, attribute value, class probability distribution and record set indices as [IP_Known:1; 0:0.7, 1:0.3; {1, 3, 4, 5, 9, 11 . . . }]. Generating a higher size pattern by 1, would require considering the higher indexed attributes in the dataset (e.g. Payee_Status and OTP) and the values these attributes take in the record set. If OTP takes the value of 0 and 1 in the record set, the higher sized patterns would now be [IP_Known:1, OTP:1; 0:0.8, 1:0.2; {3, 4, 9, 11 . . . }] and [IP_Known:1, OTP:0; 0:0.6, 1:0.4; {1, 5, . . . }]. Similarly, the attribute Payee_Status is also used to generate higher sized patterns. This process is repeated until all the attributes with higher indices are exhausted.

For the higher sized refined pattern, the system checks whether all of its super-patterns exist in the list of refinable patterns of size k−1, if yes, re-computing of the statistics to the refined pattern is done as per step B described above.

The system checks if the refined k sized pattern class frequencies are the same as size k−1 pattern from which it is refined and removes the size k pattern because it is fully containing the size k−1 pattern. The system does the process of evaluating the refined pattern's reliability and scope to refine further. This is done using the process followed in step C. If it turns out reliable 1508 and 1512, then the system adds it to the reliable patterns of size k of that class of the data object. Further if the pattern has further scope to be refined 1524, it adds the pattern to refinable patterns of size k to the data object if it is not added already to that.

The system also checks if the refined pattern has significantly higher-class probability 1520 than each of its super-pattern stored in the reliable patterns of size k−1 (the retained highest probability amongst all super-patterns) of the same class of the data object. If yes, the system attaches the list of records to the pattern adds the pattern to the significant patterns of size k of the data object. For example, the pattern [IP_Known:1, OTP:1, Payee_Status:1] might have been generated from [IP_Known:1, OTP:1] but this needs to be significant over the size 2 patterns [IP_Known:1, OTP:1], [OTP:1, Payee_Status:1] and [IP_Known:1, Payee_Status:1] which would have been generated at size 2 level.

Figure 16:
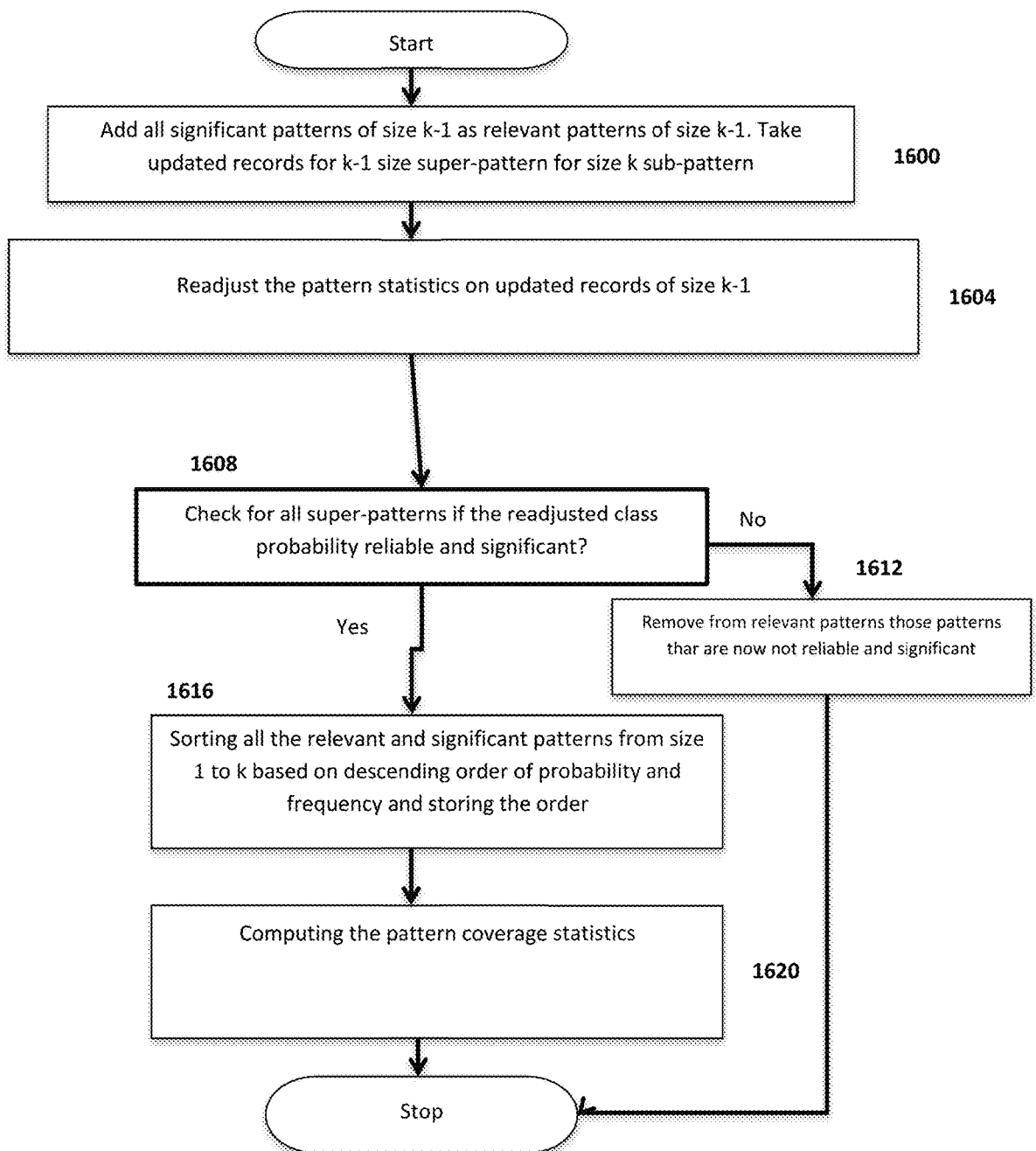
FIG. 16 depicts a flow diagram for generating the relevant patterns.

FIG. 16 shows the diagram for generating the relevant pattern. Once a pattern is added to the significant patterns of size k 1600, the system takes each of its super patterns stored in the significant super patterns of size k−1 1608 and removes all the record id's 1612 covered by higher sized significant pattern of size k from the lower sized k−1 pattern. Readjust Pattern Statistics and Removal of Super-Patterns Once all the significant patterns are found, the system takes each pattern stored in the significant patterns of size k−1 and re computes the pattern statistics like class frequency, estimated class probability etc. from the updated record set of that pattern and adds it to the relevant patterns of size k−1.

Pseudo Code to generate size k patterns:

01) Generate size_k_patterns (Data with size k−1 patterns are already computed)
02) For all refinable patterns (RP) of size k−1 of Data{
03)     for all attributes (A) with higher attribute index of RP) {
      build pattern hash map of A on the record set of RP with key as attribute value and value as PatternExtractor.
      (Pattern Extractor holds the class distribution for that attribute value in the Data and the set of records having that attribute value)
      Take each entry in the pattern hash map and generate patterns of size k.
04)     for all patterns (P) of size k
      if (class frequency distribution of size k (P) is different than class frequency distribution of size k−1 (RP)){
        for all classes c in Data{
          if(class c frequency of P > required minimum class c frequency and class c estimated probability of P > required minimum class c probability) {
05)     add P to reliable patterns of size k class c
06)     if(pattern has scope to be refined further)
      add P to Refinable Patterns of size k class c}
07)     if(class c estimated probability of p is significantly higher than the class c probability of each of its super patterns stored in the reliable patterns of size k−1 of class c of Data){update the pattern record set (PRS) IDs from pattern hash map of attribute A.
08)     add P to significant patterns of size k of class c
09)     for all super patterns (SP) of P in significant patterns of size k−1 of class c{
10)     from SP remove all the records covered by P.
      }
      }
    }
  }
}
11) For all p' in significant patterns list of size k−1 of class c {
    Re-compute pattern statistics of p' with updated pattern records.
    If (class frequency of p' > required minimum class c frequency and class estimated probability of p' > required minimum class c probability)
    Add p' to the relevant patterns of size k−1 of class c.

(E) Sort the Patterns Up to Size k

For each class $d_1$, all the patterns in the relevant patterns from size 1 to size k−1 and significant patterns of size k will be added to the list of sorted patterns of class $d_1$ and sort them 1616 according to the high class probability, high class frequency and low pattern size in that order.

(F) Finding the Cumulative Coverage of Records by the Sorted Class Patterns

The system computes the cumulative coverage of the sorted relevant patterns of up to size k (<=n) by finding out the union of records of that particular class. It also, computes the precision of the coverage of that particular class 1620. The two measures of coverage and precision indicate the quality or predictive power of patterns that can be found from the dataset.

Example Implementations of Claimed Pattern Searching Method

Pattern Output Statistics

The pattern output statistics are pattern frequency (number of times the pattern occurred in the training dataset), pattern class probability (the estimated probability of the class from the pattern on the entire data set), cumulative class coverage (the proportion of the class occurrences covered by the pattern in relation to the total occurrences of the class in the training dataset) and the cumulative class probability (the precision or positive prediction rate of all the patterns considered so far in the order of the sorted patterns.

Example 1

Searching for Patterns on Fraud on Online Fund Transfers

An example of finding reliable significant relevant patterns to find fraud in a dataset of online fund transfer transactions is given below. This dataset has 69999 records and 8 condition attributes [Authentication Level, OTP, IPUsed Known, Payee Type (scaled number of months since the payee was added using a normal distribution), Known Location, Week Day, Time Slots, Device Type] and a decision attribute called [Truth Fraud] which has two classes with values of 0 for not fraud and 1 for fraud. First 20 rows of the Online Fund Transfer Transaction Dataset are given below.

| Authentication Level | OTP | IPUsed Known | Payee Type | Known Location | WeekDay | TimeSlots | DeviceType | Truth-Fraud |
|---|---|---|---|---|---|---|---|---|
| 2 | 1 | 1 | 0.693147181 | 0 | 1 | 6 | Tablet | 1 |
| 2 | 1 | 1 | 0.693147181 | 1 | 4 | 2 | PC | 0 |
| 2 | 1 | 0 | 1.791759469 | 1 | 3 | 0 | PC | 0 |
| 2 | 1 | 1 | 0.693147181 | 1 | 2 | 1 | PC | 0 |
| 1 | 1 | 0 | 0.693147181 | 1 | 5 | 0 | Tablet | 0 |
| 3 | 1 | 1 | 1.791759469 | 1 | 3 | 3 | PC | 1 |
| 3 | 0 | 0 | 1.386294361 | 1 | 6 | 1 | Tablet | 0 |
| 2 | 1 | 1 | 1.098612289 | 1 | 2 | 3 | Mac | 0 |
| 2 | 1 | 1 | 1.609437912 | 1 | 2 | 5 | Mac | 0 |
| 2 | 1 | 1 | 1.609437912 | 1 | 6 | 2 | Mac | 0 |
| 3 | 1 | 1 | 0.693147181 | 1 | 1 | 5 | PC | 1 |
| 3 | 1 | 1 | 1.386294361 | 1 | 3 | 2 | Mac | 0 |
| 2 | 1 | 1 | 1.791759469 | 1 | 5 | 3 | PC | 0 |
| 2 | 1 | 1 | 1.098612289 | 1 | 6 | 4 | PC | 0 |
| 2 | 1 | 1 | 1.098612289 | 1 | 6 | 5 | PC | 0 |
| 3 | 1 | 1 | 1.386294361 | 1 | 5 | 5 | PC | 0 |
| 3 | 1 | 1 | 1.098612289 | 1 | 2 | 0 | Mac | 1 |
| 2 | 1 | 1 | 1.386294361 | 1 | 3 | 2 | Mac | 0 |
| 2 | 1 | 1 | 1.386294361 | 1 | 4 | 5 | Mac | 0 |
| 3 | 1 | 1 | 0.693147181 | 0 | 7 | 6 | PC | 0 |

If the initial parameters are set as minimum class probability=0.5, confidence=0.9, significance=0.2, number of iterations=3. By the end of the first iteration, the system calculates the following patterns of size 1. (Note: In these patterns, attribute values are discretized values). Only top 10 patterns are given here.

Total patterns for class 0=16

1:Pattern: AuthenticationLevel=3; pattern frequency=27912; pattern class probability=0.9841006376947306; cumulative class coverage=42.482347306129384; cumulative class probability=0.9850601891659502

2:Pattern: WeekDay=1; pattern frequency=9934; pattern class probability=0.961903107352717; cumulative class coverage=51.1178751873426; cumulative class probability=0.9779485663612179

3:Pattern: PayeeType=1.791759469; pattern frequency=14195; pattern class probability=0.9600633847244076; cumulative class coverage=61.83155390058867; cumulative class probability=0.970297989961933

4:Pattern: PayeeType=1.609437912; pattern frequency=14016; pattern class probability=0.9491776428522911; cumulative class coverage=72.28565689652508; cumulative class probability=0.9624357128162929

5:Pattern: IPUsedKnown=1; pattern frequency=55155; pattern class probability=0.9468494252584398; cumulative class coverage=95.3786251757544; cumulative class probability=0.9424571367501794

6:Pattern: OTP=1; pattern frequency=56067; pattern class probability=0.9465414286602692; cumulative class coverage=99.51020534293352; cumulative class probability=0.9314878292185534

7:Pattern: TimeSlots=0; pattern frequency=5787; pattern class probability=0.9457245647250662; cumulative class coverage=99.57046399159469; cumulative class probability=0.9310823111265225

8:Pattern: WeekDay=2; pattern frequency=9793; pattern class probability=0.9429785159806202; cumulative class coverage=99.65235395003167; cumulative class probability=0.9299937996568182

9:Pattern: TimeSlots=1; pattern frequency=11881; pattern class probability=0.9409192381832622; cumulative class coverage=99.73424390846866; cumulative class probability=0.9290834244919108

10:Pattern: DeviceType=Mac; pattern frequency=11732; pattern class probability=0.9401700356472206; cumulative class coverage=99.78214180868652; cumulative class probability=0.9284738695995974

By the end of the second iteration, the system calculates the following patterns of size up to 2 as: (Note: In these patterns, attribute values are discretized values). Only top 10 patterns are given here.

Total patterns for class 0=32.

1:Pattern: AuthenticationLevel=3,PayeeType=1.791759469; pattern frequency=5587; pattern class probability=0.9938238082510433; cumulative class coverage=8.590720168106179; cumulative class probability=0.995167352

2:Pattern: AuthenticationLevel=3,PayeeType=1.609437912; pattern frequency=5449; pattern class probability=0.992236219878525; cumulative class coverage=16.95740177067721; cumulative class probability=0.9944726350126858

3:Pattern: AuthenticationLevel=3,WeekDay=1; pattern frequency=4016; pattern class probability=0.9919694453009519; cumulative class coverage=20.727430045889278; cumulative class probability=0.9938509408801304

4:Pattern: AuthenticationLevel=3,IPUsedKnown=1; pattern frequency=21908; pattern class probability=0.9914427250130493; cumulative class coverage=37.976854498539886; cumulative class probability=0.9909688344151917

5:Pattern: AuthenticationLevel=3,OTP=1; pattern frequency=22336; pattern class probability=0.990622250953324; cumulative class coverage=41.68662412509077; cumulative class probability=0.988169798190675

6:Pattern: AuthenticationLevel=3,KnownLocation=1; pattern frequency=24783; pattern class probability=0.9893176266429389; cumulative class coverage=42.409727909024895; cumulative class probability=0.9862738052461373

7:Pattern: AuthenticationLevel=3,TimeSlots=2; pattern frequency=4621; pattern class probability=0.9889388036968367; cumulative class coverage=42.42672393813445; cumulative class probability=0.98610213316095670.9861021331609567

8:Pattern: AuthenticationLevel=3,TimeSlots=1; pattern frequency=4679; pattern class probability=0.9881401469396048; cumulative class coverage=42.43599449946694; cumulative class probability=0.9859635267087881

9:Pattern: AuthenticationLevel=3,WeekDay=4; pattern frequency=4067; pattern class probability=0.9877035588489343; cumulative class coverage=42.43908468657777; cumulative class probability=0.9859291431853261

10:Pattern: AuthenticationLevel=3,DeviceType=Mac; pattern frequency=4715; pattern class probability=0.9868442888722542; cumulative class coverage=42.44217487368861; cumulative class probability=0.9857886237215144

By the end of the third iteration, the system calculates the following patterns of size up to 3 as:

(Note: In these patterns, attribute values are discretized values). Only top 10 patterns are given here.

Total size 3 patterns for class 1=23.

1:Pattern: AuthenticationLevel=1,IPUsedKnown=0, KnownLocation=0; pattern frequency=306; pattern class probability=0.7491663710245262; cumulative class coverage=4.528230390299356; cumulative class probability=0.7810457516339869

2:Pattern: AuthenticationLevel=1,OTP=0,KnownLocation=0; pattern frequency=332; pattern class probability=0.7464005518670762; cumulative class coverage=8.27965138309966; cumulative class probability=0.7626527050610821

3:Pattern: AuthenticationLevel=1,OTP=0, IPUsedKnown=0; pattern frequency=557; pattern class probability=0.7261845490792437; cumulative class coverage=15.062523683213339; cumulative class probability=0.7464788732394366

4:Pattern: AuthenticationLevel=1,OTP=0,PayeeType=0.693147181; pattern frequency=588; pattern class probability=0.6637584199767628; cumulative class coverage=19.704433497536947; cumulative class probability=0.699394754539341

5:Pattern: AuthenticationLevel=1,PayeeType=0.693147181, KnownLocation=0; pattern frequency=337; pattern class probability=0.6429947; cumulative class coverage=21.75066312; cumulative class probability=0.67489711

6:Pattern: AuthenticationLevel=1,IPUsedKnown=0,PayeeType=0.693147181; pattern frequency=605; pattern class probability=0.6310089043172701; cumulative class coverage=26.392572944297083; cumulative class probability=0.6488122962272939

7:Pattern: AuthenticationLevel=1,KnownLocation=0,WeekDay=7; pattern frequency=244; pattern class probability=0.603110744442663; cumulative class coverage=27.18832891246684; cumulative class probability=0.6346749226006192

8:Pattern: AuthenticationLevel=1, IPUsedKnown=0,WeekDay=7; pattern frequency=451; pattern class probability=0.5888559240894284; cumulative class coverage=29.348237968927627; cumulative class probability=0.6151707704527403

9:Pattern: AuthenticationLevel=1,PayeeType=1.098612289, KnownLocation=0; pattern frequency=284; pattern class probability=0.5820566733508209; cumulative class coverage=30.59871163319439; cumulative class probability=0.6062312312312312

10:Pattern: AuthenticationLevel=1,KnownLocation=0, WeekDay=6; pattern frequency=240; pattern class probability=0.5713622793398951; cumulative class coverage=31.091322470632814; cumulative class probability=0.5949963741841915

Total size 3 patterns for class 0=182.

1:Pattern: AuthenticationLevel=3,WeekDay=2, TimeSlots=2; pattern frequency=642; pattern class probability=0.997439079238668; cumulative class coverage=0.991950062576289; cumulative class probability=1.0

2:Pattern: AuthenticationLevel=3,IPUsedKnown=1,PayeeType=1.791759469; pattern frequency=4328; pattern class probability=0.9968241742843088; cumulative class coverage=7.515335053537492; cumulative class probability=0.9981530884465422

3:Pattern: AuthenticationLevel=3,OTP=1,PayeeType=1.791759469; pattern frequency=4478; pattern class probability=0.9961310079521698; cumulative class coverage=9.009440521623583; cumulative class probability=0.9974341430037632

4:Pattern: AuthenticationLevel=3,OTP=1,PayeeType=1.609437912; pattern frequency=4341; pattern class probability=0.9960089812351578; cumulative class coverage=15.535915699695616; cumulative class probability=0.9973219599285856

5:Pattern: AuthenticationLevel=3,IPUsedKnown=1,PayeeType=1.609437912; pattern frequency=4310; pattern class probability=0.9957071662398213; cumulative class coverage=16.826068818466958; cumulative class probability=0.9967963386727688

6:Pattern: AuthenticationLevel=3,PayeeType=1.791759469, KnownLocation=1; pattern frequency=4943; pattern class probability=0.9953158858556772; cumulative class coverage=17.16289921354738; cumulative class probability=0.9960545193687231

7:Pattern: AuthenticationLevel=3,IPUsedKnown=1,WeekDay=1; pattern frequency=3190; pattern class probability=0.995315234639953; cumulative class coverage=20.18819239504952; cumulative class probability=0.9961119158344134

8:Pattern: AuthenticationLevel=3,OTP=1,IPUsedKnown=1; pattern frequency=17542; pattern class probability=0.9951675022270328; cumulative class coverage=33.73248250181548; cumulative class probability=0.9949867833378908

9:Pattern: AuthenticationLevel=3,OTP=1,WeekDay=1; pattern frequency=3180; pattern class probability=0.9949255081762641; cumulative class coverage=34.34588464331515; cumulative class probability=0.9948086820317744
10:Pattern: AuthenticationLevel=3,IPUsedKnown=1, KnownLocation=1; pattern frequency=19461; pattern class probability=0.9947636922743341; cumulative class coverage=37.27383693082616; cumulative class probability=0.993452209364576

Likewise, patterns get generated for higher sizes until n.

Example 2

Searching for Patterns on the Income Level of a US Citizen Based on Other Demographic and Financial Information Another example for using this technology is for searching for patterns on the income level of a US citizen based on demographic and financial information. An example of finding reliable significant relevant patterns for a dataset of census income is given below.

This dataset is collected from the website http://archive.ics.uci.edu/ml/datasets/Adult. The dataset has 32561 records and 14 condition attributes with decision attribute "income". Out of the 14 condition attributes only 9 attributes age (continuous), work class, education, occupation, relationship, sex, capital-gain (continuous), capital-loss (continuous) and hours-per-week (continuous) are considered for convenience in this example. The decision attribute "income" has two values <=50K and >50K.

First 15 rows of the census income dataset are given below:

The initial parameters are set as minimum class probability=0.5, confidence=0.9, significance=0.2, number of iterations=2.

By the end of the first iteration, the system calculates the following significant patterns. (Note: In these patterns, attribute values are discretized values). Only top 10 patterns are given here:

Total patterns for class >50K=6.
1:Pattern: capital-gain=2; pattern frequency=1834; pattern class probability=0.854771459972253; cumulative class coverage=20.239765; cumulative class probability=0.8653217011
2:Pattern: education=Doctorate; pattern frequency=413; pattern class probability=0.7122922089814671; cumulative class coverage=23.275092462; cumulative class probability=0.8379247015610652
3:Pattern: education=Prof-school; pattern frequency=576; pattern class probability=0.7100985080; cumulative class coverage=26.909832929; cumulative class probability=0.8068833652007649
4:Pattern: capital-loss=2; pattern frequency=47; pattern class probability=0.542795539; cumulative class coverage=27.17765591; cumulative class probability=0.8032416132679985
5:Pattern: education=Masters; pattern frequency=1723; pattern class probability=0.541192432; cumulative class coverage=36.51319984; cumulative class probability=0.6942289039767217

Total patterns for class <=50K=37
1:Pattern: age=0; pattern frequency=2015; pattern class probability=0.9976136570; cumulative class cover-

| age | workclass | education | occupation | relationship | sex | capital-gain | capital-loss | hours-per-week | Income |
|---|---|---|---|---|---|---|---|---|---|
| 39 | State-gov | Bachelors | Adm-clerical | Not-in-family | Male | 2174 | 0 | 40 | <=50K |
| 50 | Self-emp-not-inc | Bachelors | Exec-managerial | Husband | Male | 0 | 0 | 13 | <=50K |
| 38 | Private | HS-grad | Handlers-cleaners | Not-in-family | Male | 0 | 0 | 40 | <=50K |
| 53 | Private | 11th | Handlers-cleaners | Husband | Male | 0 | 0 | 40 | <=50K |
| 28 | Private | Bachelors | Prof-specialty | Wife | Female | 0 | 0 | 40 | <=50K |
| 37 | Private | Masters | Exec-managerial | Wife | Female | 0 | 0 | 40 | <=50K |
| 49 | Private | 9th | Other-service | Not-in-family | Female | 0 | 0 | 16 | <=50K |
| 52 | Self-emp-not-inc | HS-grad | Exec-managerial | Husband | Male | 0 | 0 | 45 | >50K |
| 31 | Private | Masters | Prof-specialty | Not-in-family | Female | 14084 | 0 | 50 | >50K |
| 42 | Private | Bachelors | Exec-managerial | Husband | Male | 5178 | 0 | 40 | >50K |
| 37 | Private | Some-college | Exec-managerial | Husband | Male | 0 | 0 | 80 | >50K |
| 30 | State-gov | Bachelors | Prof-specialty | Husband | Male | 0 | 0 | 40 | >50K |
| 23 | Private | Bachelors | Adm-clerical | Own-child | Female | 0 | 0 | 30 | <=50K |
| 32 | Private | Assoc-acdm | Sales | Not-in-family | Male | 0 | 0 | 50 | <=50K |
| 40 | Private | Assoc-voc | Craft-repair | Husband | Male | 0 | 0 | 40 | >50K | age=8.1432038; cumulative class probability=0.9990074441687344

2:Pattern: age=2; pattern frequency=1485; pattern class probability=0.9852077395569897; cumulative class coverage=14.08576051; cumulative class probability=0.994857142

3:Pattern: relationship=Own-child; pattern frequency=5068; pattern class probability=0.9845597295201882; cumulative class coverage=25.2144012; cumulative class probability=0.98701504354711

4:Pattern: occupation=Priv-house-serv; pattern frequency=149; pattern class probability=0.9776455647289567; cumulative class coverage=25.67152103; cumulative class probability=0.9870897495722507

5:Pattern: age=3; pattern frequency=1675; pattern class probability=0.9688879584; cumulative class coverage=29.680420711974108; cumulative class probability=0.9836439200965277

6:Pattern: education=Preschool; pattern frequency=51; pattern class probability=0.9673676467212601; cumulative class coverage=29.834142394; cumulative class probability=0.983726824

7:Pattern: occupation=Other-service; pattern frequency=3295; pattern class probability=0.95373023; cumulative class coverage=37.5323624; cumulative class probability=0.9736593

8:Pattern: relationship=Other-relative; pattern frequency=981; pattern class probability=0.9536727782774169; cumulative class coverage=39.47815533; cumulative class probability=0.971624850

9:Pattern: education=1st-4th; pattern frequency=168; pattern class probability=0.9407863757394422; cumulative class coverage=39.842233009; cumulative class probability=0.97130177

10:Pattern: education=11th; pattern frequency=1175; pattern class probability=0.94005215; cumulative class coverage=41.614077; cumulative class probability=0.9680971202710333

By the end of the second iteration, the system calculates the following significant patterns of size up to as: (Note: In these patterns, attribute values are discretized values). Only top 10 patterns are given here.

Total patterns for class >50K=121.

1:Pattern: education=Prof-school, capital-gain=2; pattern frequency=139; pattern class probability=0.9760438238771033; cumulative class coverage=1.75997959; cumulative class probability=0.99280575

2:Pattern: education=Doctorate,capital-gain=2; pattern frequency=69; pattern class probability=0.9519396604109573; cumulative class coverage=2.62721591; cumulative class probability=0.99038461

3:Pattern: capital-gain=2, workclass=Self-emp-inc; pattern frequency=180; pattern class probability=0.9379101275180156; cumulative class coverage=4.285167708200484; cumulative class probability=0.9739130434782609

4:Pattern: education=Prof-school, workclass=Self-emp-inc; pattern frequency=81; pattern class probability=0.9248820092532015; cumulative class coverage=4.859074097691621; cumulative class probability=0.9694656488549618

5:Pattern: occupation=Exec-managerial, capital-gain=2; pattern frequency=464; pattern class probability=0.9190791416172693; cumulative class coverage=9.144241805892106; cumulative class probability=0.9496688741721855

6:Pattern: hours-per-week=8,capital-gain=2; pattern frequency=362; pattern class probability=0.9148405550795286; cumulative class coverage=11.2485652; cumulative class probability=0.94029850

7:Pattern: relationship=Husband, capital-gain=2; pattern frequency=1204; pattern class probability=0.91317845; cumulative class coverage=17.6380563; cumulative class probability=0.9171087

8:Pattern: education=Bachelors,capital-gain=2; pattern frequency=519; pattern class probability=0.8919375237403592; cumulative class coverage=18.709348; cumulative class probability=0.9083591

9:Pattern: age=12,capital-gain=2; pattern frequency=180; pattern class probability=0.8861262456379377; cumulative class coverage=18.862390; cumulative class probability=0.90791896

10:Pattern: sex=Male,capital-gain=2; pattern frequency=1488; pattern class probability=0.8775414772132795; cumulative class coverage=19.5893380; cumulative class probability=0.8899188

Total patterns of class <=50K=175

1:Pattern: relationship=Own-child,age=0; pattern frequency=1453; pattern class probability=0.9988691385182868; cumulative class coverage=5.877831715210356; cumulative class probability=1.0

2:Pattern: relationship=Own-child,hours-per-week=0; pattern frequency=1231; pattern class probability=0.9972853234330971; cumulative class coverage=8.60841423; cumulative class probability=0.99953029

3:Pattern: education=11$^{th}$,hours-per-week=0; pattern frequency=308; pattern class probability=0.99465586106615039; cumulative class coverage=8.9199029; cumulative class probability=0.999546690

4:Pattern: relationship=Own-child,occupation=Other-service; pattern frequency=891; pattern class probability=0.9946067535537718; cumulative class coverage=10.49352750; cumulative class probability=0.998844820

5:Pattern: age=2,hours-per-week=0; pattern frequency=278; pattern class probability=0.994077749795712; cumulative class coverage=10.80906148; cumulative class probability=0.9988785046728972

6:Pattern: relationship=Own-child,occupation=?; pattern frequency=543; pattern class probability=0.993849236892182; cumulative class coverage=11.646440; cumulative class probability=0.9986125

7:Pattern: relationship=Own-child,workclass=?; pattern frequency=538; pattern class probability=0.9937921325293108; cumulative class coverage=11.646440; cumulative class probability=0.99861255

8:Pattern: relationship=Own-child,age=2; pattern frequency=800; pattern class probability=0.9922780705491191; cumulative class coverage=13.365695; cumulative class probability=0.9981873

9:Pattern: relationship=Own-child,occupation=Handlers-cleaners; pattern frequency=418; pattern class probability=0.99201233; cumulative class coverage=14.057443; cumulative class probability=0.997989

10:Pattern: age=0; pattern frequency=562; pattern class probability=0.9914552885232788; cumulative class coverage=16.26618; cumulative class probability=0.9977667

All examples and conditional language recited herein are intended for educational purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A method for searching for patterns executed on at least one computer processor comprising steps of:
    generating all size 1 patterns in a data set via said computer processor; where in generating size 1 patterns further comprises steps of:
        building a pattern hash map for each attribute in said data set with key as attribute value and value as Pattern Extractor, wherein Pattern Extractor is a data structure to store record id set of all records having same attribute value, and class distribution hash map with class as key and frequency of that class records in record id set as value;
        scanning each record in said data set and updating pattern hash map for each attribute; and
        extracting each size 1 pattern from all attribute pattern hash maps with attribute and attribute value combination as the pattern condition and the record id set as pattern record set;
    calculating if each pattern of size 1 is a reliable class pattern for any class, via computer processors; wherein reliable class pattern calculation further comprises steps of:
        calculating a frequency of a pattern of size 1 in a dataset;
        verifying if class frequency is higher than required minimum frequency for each class;
        calculating a class probability associated with said pattern of size 1 for each class; and
        checking if a lower bound of a confidence interval of a pattern class probability is higher than a given probability for each class;
    calculating if reliable class patterns of size 1 is a significant class pattern for any class if class probability is higher than class probability of that class in said dataset;
    storing each significant class pattern of size 1 in a hash table with condition set as key and class pattern as value;
    for each class, sorting the reliable significant class patterns of that class of size 1 and prioritizing in the order of high class probability and then high class frequency and storing the order after generation of all relevant significant class patterns;
    calculating if each pattern of size 1 is a refinable pattern for any class where at least one class has said required given minimum frequency and does not have 1 as an upper end of an estimated population probability confidence interval;
    storing all refinable patterns in a hash map with key as pattern condition set and value as the refinable pattern wherein refinable pattern stores pattern condition set, list of classes for which the pattern can be refined along with required minimum probability and frequency for the refined class pattern;
    generating all size k patterns from refinable patterns of size k−1 by adding one conditional attribute and an attribute value to size k−1 pattern condition set in such a way that the attribute's index is higher than the existing attributes' index in sorted attribute list based on their discernibility strength wherein k value is any value greater than or equal to 2, via said computer processors; further comprising said steps of:
        building a pattern hash map for each higher index attribute with key as attribute value and value as Pattern Extractor, wherein Pattern Extractor is a data structure to store record id set of all records in size k−1 refinable pattern having same attribute value, and the class distribution hash map with class as key and frequency of that class records in record id set as value;
        scanning each record in size k−1 refinable pattern set and updating pattern hash map for each attribute;
        calculating all size k patterns from all attribute pattern hash maps by adding attribute and attribute value combination to the pattern condition set and the hash map record id set of attribute value is pattern record id set;
        checking if the record id set of size k pattern is not same as record id set of size k−1 refinable pattern
        calculating keys of all possible super patterns of size k−1 for each size k pattern by removing one condition at a time;
        calculating if each possible super pattern is present in refinable patterns of size k−1;
        calculating if a class is present in refinable classes for all its super patterns;
        calculating the maximum of minimum required class frequencies to be required to refine all its super patterns for that class;
        calculating maximum of minimum required class probability to be required to refine all its super patterns for that class;
    calculating if each pattern of size k is a reliable class pattern for each refinable class if its estimated lowest value of the confidence interval of that class probability in the entire population of records is above the maximum of minimum required class probability to refine all its super patterns for that class;
    calculating if reliable class pattern of size k in said data set is a significant class pattern if it has significantly high-class probability for that class than all its super class patterns in said dataset by checking the class probability of size k pattern not less than the maximum of minimum required class probability to refine all its super patterns for that class and higher than the class probability of that class in said dataset; and
    storing each significant class pattern in a hash table with condition set as key and class pattern as value.

2. The computer implemented method of claim 1, further comprising:

readjusting pattern statistics for size k−1—where k value is any value greater than or equal to 2 and removing patterns of size k−1 patterns if not relevant further comprising of:
  updating a record set for each super-pattern of size k−1 after the generation of significant sub-pattern of size k by removing record ids from record id set of a super-pattern that occur in a significant sub-pattern;
  calculating pattern statistics for said significant pattern of size k−1 on the updated record set and check for reliability;
  removing non-reliable patterns for size k−1 from significant class patterns of size k−1 hash table;
  updating reliable significant patterns of size k−1 with re-computed pattern statistics into a relevant pattern set in significant class patterns of size k−1 hash table;
  for each class, sorting the remaining reliable significant relevant class patterns of that class of up to size k and prioritizing in the order of high class probability and then high class frequency and low pattern size and storing the order after generation of all relevant significant relevant class patterns; and
  for each class, computing a cumulative coverage of the remaining sorted reliable significant relevant class patterns of that class of up to size k by finding out the union of records of that class.

3. The computer implemented method of claim 1, wherein further comprising of:
  calculating a class distribution by counting a frequency of the records for each class in said dataset;
  converting continuous values of each attribute into discrete values using discretization techniques;
  removing attributes which can't distinguish different records within attribute set using variability test;
  calculating a discernibility strength of each attribute using said attribute values and said class probabilities for each class associated with each value of said attribute; and
  sorting all said attributes based on descending order of discernibility strength and storing the order.

4. A computer system comprising:
  at least one processor;
  a database; and
  a memory store, wherein the memory store comprises computer-executable instructions that, when executed by the processors, cause said computer-implemented system to:
    generating size 1 patterns in a data set via said computer processor; where in generating size 1 patterns further comprises steps of:
      building a pattern hash map for each attribute in said data set with key as attribute value and value as class distribution hash map with class as key and the record id set belongs to that class as value;
      scanning each record in said data set and updating pattern hash map for each attribute; and
      extracting each size 1 pattern from all attribute pattern hash maps with attribute and attribute value combination as the pattern condition and the union of records in class distribution hash map for all classes as pattern record set;
    calculate if each pattern of size 1 is a reliable class pattern; wherein the computer-executable instructions that, when executed by said processors, cause said computer system to:
      calculate the frequency of each pattern of size 1 in a dataset;
      verify if class frequency is higher than a required minimum frequency;
      calculate a class probability associated with said pattern of size 1;
      checking if a lower end of a confidence interval of a pattern class probability is higher than the given probability
    calculate if each reliable class pattern of size 1 is a significant class pattern for any class if class probability in said reliable class pattern has a lower end of a confidence interval of a pattern class probability that is higher than class probability of that class in said dataset;
    calculate if each pattern of size 1 is a refinable pattern for any class at least one class has said required minimum frequency and does not have 1 as an upper end of an estimated population probability confidence interval;
    storing all refinable patterns in a hash map with key as pattern condition set and value as the refinable pattern wherein refinable pattern stores pattern condition set, list of classes for which the pattern can be refined along with required minimum probability and frequency for the refined class pattern;
    generating all size k patterns from refinable patterns of size k−1 by adding one conditional attribute and an attribute value to size k−1 pattern condition set in such a way that the attribute's index is higher than the existing attributes' index in sorted attribute list based on their discernibility strength wherein k value is any value greater than or equal to 2, via said computer processors; further comprising said steps of:
      building a pattern hash map for each higher index attribute with key as attribute value and value as Pattern Extractor, wherein Pattern Extractor is a data structure to store record id set of all records in size k−1 refinable pattern having same attribute value, and the class distribution hash map with class as key and frequency of that class records in record id set;
      scanning each record in size k−1 refinable pattern set and updating pattern hash map for each attribute;
      calculating all size k patterns from all attribute pattern hash maps by adding attribute and attribute value combination to the pattern condition set and the hash map record id set of attribute value is pattern record id set;
      calculating keys of all possible super patterns of size k−1 for each size k pattern by removing one condition at a time;
      calculating if each possible super pattern is present in refinable patterns of size k−1;
      calculating if a class is present in refinable classes for all its super patterns;
      calculating the maximum of minimum required class frequencies to be required to refine all its super patterns for that class;
      calculating maximum of minimum required class probability to be required to refine all its super patterns for that class;
      calculating if each pattern of size k is a reliable class pattern for each refinable class if its estimated lowest value of the confidence interval of that class probability in the entire population of records is above the maximum of minimum required class probability to refine all its super patterns for that class;

calculating if reliable class pattern of size k in said data set is a significant class pattern if it has significantly high-class probability for that class than all its super class patterns in said dataset by checking the class probability of size k pattern not less than the maximum of minimum required class probability to refine all its super patterns for that class and higher than the class probability of that class in said dataset; and adding said reliable class pattern of size k to significant class pattern hash table.

5. The computer-implemented system according to claim 4 wherein the computer-executable instructions that, when executed by the processors, cause the computer-implemented system to:

readjust pattern statistics for size k−1 patterns—where k value is any value greater than or equal to 2 and remove reliable significant class patterns of size k−1 if not relevant wherein the computer-executable instructions that, when executed by the processor, cause the computer-implemented system to:

update the record set for each super-pattern of size k−1 after the generation of significant sub-pattern of size k by removing record ids from record id set of the super-pattern that occur in the significant sub-pattern;

calculate pattern statistics for said significant class pattern of size k−1 on the updated record set and check for reliability;

remove non-reliable significant class patterns for size k−1;

update reliable significant class patterns of size k−1 with re-computed pattern statistics into a reliable significant pattern set; and for each class, sort the remaining reliable significant relevant patterns of that class of up to size k and prioritizing in the order of high class probability and then high class frequency and low pattern size and store an order after generation of all reliable significant relevant patterns; and for each class, compute a cumulative coverage of the remaining sorted reliable significant relevant patterns of that class of up to size k by finding out the union of records of that class.

6. The computer-implemented system according to claim 4 wherein the computer-executable instructions that, when executed by the processor, cause said computer-implemented system to:

preprocess a dataset wherein the computer-executable instructions that, when executed by the processor, cause said computer-implemented system to:

calculate a class distribution by counting a frequency of the records for each class in said dataset;

convert continuous values of each attribute into discrete values using discretization techniques;

remove attributes which don't have enough variability to distinguish different records using variability test further comprising steps of:

calculate the confidence interval of the probability for each attribute value that the attribute can take; and calculate if any confidence interval of the probability that the attribute can take a value contains 1 and remove such attributes form data set;

calculate a discernibility strength of each attribute using said attribute values and said class probabilities for each class associated with said each value of said attribute discernibility strength further comprising steps of:

calculating class distribution hash map for each value of each attribute;

calculating the class probability for each class for that attribute value by dividing the class frequency by the frequency of that attribute value;

calculating a lift in class probabilities as the product of the positive difference in class probability and the class frequency for each attribute value if its class probability is more than the class probability for any class in the entire dataset; and calculating the average lift in class probabilities for each attribute dividing the sum of lifts for each attribute value by number of records in data set and assigning the resulting value to the discernibility strength of the attribute; and sort all the attributes based on descending order of discernibility strength and storing the sorted attributes.

7. The computer implemented method of claim 1 wherein said reliable class pattern is defined as a pattern which has a class frequency, which is higher than required minimum frequency for at least one class and that a lower bound of a confidence interval of a pattern class probability is higher than the given probability and wherein said refinable class pattern is defined as a pattern which has a required minimum frequency for at least one class and which has a sub pattern which has a lower bound of a confidence interval of a class probability that is higher than given probability for at least one class.

8. The computer-implemented system of claim 4 wherein said reliable pattern is defined as a pattern which has a class frequency, which is higher than required minimum frequency for at least one class and that a lower bound of a confidence interval of a pattern class probability is higher than the given probability and wherein said refinable pattern is defined as a pattern which has a required minimum frequency for at least one class and which has a sub pattern which has a lower bound of a confidence interval of a class probability that is higher than the given probability for at least one class.

9. The computer implemented method of claim 1 wherein said significant pattern is defined as a reliable pattern which has a sub pattern which has a lower bound of a confidence interval of a class probability that is higher than the pattern probability.

10. The computer-implemented system of claim 4 wherein said significant pattern is defined as a reliable pattern which has a sub pattern which has a lower bound of a confidence interval of a class probability that is higher than the pattern probability.

11. The computer-implemented system of claim 4 wherein said significant pattern is defined as a reliable pattern which has a sub pattern which has a lower bound of a confidence interval of a class probability that is higher than the pattern probability.

12. The computer implemented method of claim 2 wherein said a pattern in a data set is a set of records which are defined by a minimal set of conditions;

wherein the set of records is called a pattern record set; wherein, the set of conditions is called pattern condition set and wherein the size of the pattern in a data set is the number of conditions in its pattern condition set; and wherein frequency of a pattern in a dataset is the number of records in its pattern record set and majority class of a pattern is the class to which more records in pattern record set belong to that class than other classes where in a pattern is a class pattern for all classes present in its record set.

* * * * *